United States Patent
Sato et al.

(10) Patent No.: US 7,794,534 B2
(45) Date of Patent: Sep. 14, 2010

(54) MAGENTA INK COMPOSITION, INK SET, INK CARTRIDGE, AND UTILIZING THESE, METHOD OF RECORDING, RECORDING SYSTEM AND RECORDING PRODUCT

(75) Inventors: Hironori Sato, Nagano-ken (JP); Shuichi Koganehira, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1212 days.

(21) Appl. No.: 10/572,738

(22) PCT Filed: Jun. 30, 2005

(86) PCT No.: PCT/JP2005/012097

§ 371 (c)(1),
(2), (4) Date: Mar. 21, 2006

(87) PCT Pub. No.: WO2006/004001

PCT Pub. Date: Jan. 12, 2006

(65) Prior Publication Data

US 2007/0002109 A1  Jan. 4, 2007

(30) Foreign Application Priority Data

Jun. 30, 2004 (JP) ............................. 2004-194235
Jun. 30, 2004 (JP) ............................. 2004-194252
Dec. 28, 2004 (JP) ............................. 2004-380885

(51) Int. Cl.
*C09D 11/02* (2006.01)
(52) U.S. Cl. .................... 106/31.6; 106/31.86
(58) Field of Classification Search ........... 106/31.27, 106/31.58, 31.6, 31.86
See application file for complete search history.

(56) References Cited

U.S. PATENT DOCUMENTS

| 5,958,129 A | 9/1999 | Urban et al. |
| 2003/0029355 A1* | 2/2003 | Miyabayashi ............ 106/31.27 |
| 2004/0246321 A1* | 12/2004 | Takashima et al. .......... 347/100 |
| 2005/0041082 A1* | 2/2005 | Kataoka ..................... 347/100 |

FOREIGN PATENT DOCUMENTS

| JP | 8-123017 A | 5/1996 |
| JP | 11-166128 A | 6/1999 |
| JP | 2003-268275 A | 9/2003 |
| JP | 2004-314352 A | 11/2004 |
| JP | 2005-120310 A | 5/2005 |
| JP | 2005-225955 A | 8/2005 |
| JP | 2005-225958 A | 8/2005 |
| WO | WO 2004039900 A1 * | 5/2004 |

OTHER PUBLICATIONS

English Machine Translation of JP2005-120310.*
Patent Abstract of Japan and JPO Computer English Translation of 8-123017 A Dated May 17, 1996.
Patent Abstract of Japan and JPO Computer English Translation of 11-166128 A Dated Jun. 22, 1999.
Patent Abstract of Japan and JPO Computer English Translation of 2005-120310 A Dated May 12, 2005.
Patent Abstract of Japan and JPO Computer English Translation of 2004-314352 A Dated Nov. 11, 2004.
Patent Abstract of Japan and JPO Computer English Translation of 2005-225955 A Dated Aug. 25, 2005.
Patent Abstract of Japan and JPO Computer English Translation of 2005-225958 A Dated Aug. 25, 2005.
Patent Abstract of Japan and JPO Computer English Translation of 2003-268275 A Dated Sep. 25, 2003.

* cited by examiner

*Primary Examiner*—Jerry Lorengo
*Assistant Examiner*—Veronica Faison Gee
(74) *Attorney, Agent, or Firm*—Ladas and Parry LLP

(57) ABSTRACT

A magenta ink composition, wherein when the a* value in accordance with the CIE standard that is calculated from a visible absorption spectrum is 80 in a diluted aqueous solution with a dilution ratio of 10,000 or less, the b* value is −29 or less.

24 Claims, 14 Drawing Sheets

FIG. 6 ns to a novel magenta ink composition that demonstrates excellent color reproducibility in a high-chroma and low-lightness region and increased luster and suppresses clogging of ink-jet ejection heads, and also to an ink set comprising at least a specific magenta ink and excelling in the luster of recorded images, as well as a magenta ink composition that demonstrates excellent color reproducibility in a high-chroma and low-lightness region, excels in granularity, has increased luster and suppresses clogging of ink-jet ejection heads and an ink set comprising such a composition.

2. Related Art

An ink using a pigment such as C. I. Pigment Red 202 or C. I. Pigment Red 122 has been suggested as a magenta ink for color ink jet recording (for example, JP-A-2003-268275).

When C. I. Pigment Red 202 and C. I. Pigment Red 122 are used, sufficient color reproducibility in a high-chroma and low-lightness region cannot be obtained unless the concentration of pigments in the ink is comparatively high. However, if the pigment concentration increases, the ink viscosity tends to increase and responsiveness of meniscus tends to become high. For this reason problems are easily associated with the printing speed, quality, and head life. Furthermore, if the pigment concentration is increased, a smooth ink film is difficult to form on a lustrous media and luster of the recorded matter is sometimes degraded.

A method of decreasing the quantity of glycerin added to the ink is employed to prevent the ink viscosity from increasing.

However, because glycerin functions as a wetting agent preventing clogging in ink-jet ejection devices, the ink can easily cause clogging if the content of glycerin is decreased.

Furthermore, the conventional magenta inks excel in color reproduction of dark sections with an L* value-of the recorded matter of 40 or less, but granularity is insufficient.

SUMMARY

An advantage of some aspects of the invention is to provide a magenta ink that excels in color reproducibility in a high-chroma and low-lightness region, suppresses clogging of ink-jet recording heads, and has increased luster.

Another advantage of some aspects of the invention is to provide an ink set for ink-jet recording comprising a magenta ink that excels in color reproducibility in a high-chroma and low-lightness region, suppresses clogging of ink-jet recording heads, and has increased luster.

Yet another advantage of some aspects of the invention is to provide a magenta ink that excels in color reproducibility in a high-chroma and low-lightness region, has excellent granularity, suppresses clogging of ink-jet recording heads, and has increased luster and also an ink set comprising such magenta ink.

The results of the comprehensive study conducted by the inventors demonstrated that a magenta ink comprising C. I. Pigment Violet 32 as a coloring material has excellent color reproducibility in a high-chroma and low-lightness region even at a comparatively low pigment concentration.

According to an aspect of the invention based on this finding, provided is a magenta ink composition, wherein when the a* value in accordance with the CIE standard that is calculated from a visible absorption spectrum is 80 in a diluted aqueous solution with a dilution ratio of 10,000 or less, the b* value is −29 or less. It is further preferable that the L* value of this magenta ink composition be 60 or less.

Furthermore, in addition to the above-described conditions, it is preferable that the a* value in accordance with the CIE standard that is calculated from a visible absorption spectrum be 7 or more in a diluted aqueous solution with a pigment concentration of 2×10−3 g/L.

All the above-described magenta ink compositions demonstrate excellent color reproducibility in a high-chroma and low-lightness region despite a comparatively low concentration of coloring material. Therefore, the increase in the ink viscosity caused by the increased concentration of coloring material can be prevented.

Furthermore, because of the above-described features of the magenta ink composition in accordance with the invention, a wetting agent such as a high-boiling organic solvent with a high viscosity can be added in a sufficient amount. Therefore, even when printing is conducted by using an ink-jet method, the head is prevented from clogging.

According to another aspect of the invention, provided is a recording method for forming images by using the magenta ink composition. With this recording method, good recorded images with increased luster and excellent color reproducibility in a high-chroma and low-lightness red region can be obtained.

According to another aspect of the invention, provided is a recording system for forming images by using the magenta ink composition. With this recording system, good recorded images with increased luster and excellent color reproducibility in a high-chroma and low-lightness red region can be obtained.

According to another aspect of the invention, provided is a recorded matter where images have been formed by using the magenta ink composition. This recorded matter is of high quality, excels in color reproducibility in a high-chroma and low-lightness red region and also has increased luster.

Furthermore, the results of the comprehensive study conducted by the inventors demonstrated that a magenta ink comprising C. I. Pigment Violet 32 and C. I. Pigment Violet 19 as coloring materials has excellent color reproducibility in a high-chroma and low-lightness region even at a comparatively low pigment concentration.

According to another aspect of the invention based on this finding, provided is a magenta ink composition, wherein when the a* value in accordance with the CIE standard that is calculated from a visible absorption spectrum is 80 in a diluted aqueous solution with a dilution ratio of 10,000 or less, the b* value is −38 or more to −29 or less. It is further preferable that the L* value in accordance with the CIE standard of this magenta ink composition be 60 or less.

Furthermore, in addition to the above-described conditions, it is preferable that the a* value in-accordance with the CIE standard that is calculated from a visible absorption spectrum be 5 or more, preferably 7 or more in a diluted aqueous solution with a pigment concentration of $2 \times 10-3$ g/L.

All the above-described magenta ink compositions demonstrate excellent color reproducibility in a high-chroma and low-lightness region despite a comparatively low concentration of coloring material. Therefore, the increase in the ink viscosity caused by increased concentration of coloring material can be prevented. In addition, the magenta ink compositions also excel in a granularity of printed matter. The granularity as referred to herein is a characteristic making it possible to suppress granular appearance caused by dot representation during image formation.

Furthermore, because of the above-described features of the magenta ink composition in accordance with the invention, a wetting agent such as a high-boiling organic solvent with a high viscosity can be added in a sufficient amount. Therefore, even when printing is conducted by using an ink-jet method, the recording head is prevented from clogging.

According to another aspect of the invention, provided is a recording method for forming images by using the magenta ink composition.

With this recording method, good recorded images with increased luster and excellent granularity and color reproducibility in a high-chroma and low-lightness red region can be obtained.

According to another aspect of the invention, provided is a recording system for forming images by using the magenta ink composition. With this recording system, good recorded images with increased luster and excellent color reproducibility in a high-chroma and low-lightness red region can be obtained.

According to another aspect of the invention, provided is a recorded matter where images have been formed by using the magenta ink composition. This recorded matter is of high quality, excels in color reproducibility in a high-chroma and low-lightness red region and also has excellent granularity and increased luster.

Furthermore, the results of the comprehensive study conducted by the inventors demonstrated that a magenta ink comprising C. I. Pigment Violet 32 as a coloring material has excellent color reproducibility in a high-chroma and low-lightness region even at a comparatively low pigment concentration.

According to another aspect of the invention based on this finding, provided is an ink set comprising a magenta ink wherein when the a* value in accordance with the CIE standard that is calculated from a visible absorption spectrum is 80 in a diluted aqueous solution with a dilution ratio of 10,000 or less, the b* value is −29 or less. It is further preferable that the L* value of this magenta ink be 60 or less.

Furthermore, in addition to the above-described conditions, it is preferable that the a* value in accordance with the CIE standard that is calculated from a visible absorption spectrum be 7 or more in a diluted aqueous solution with a pigment concentration of $2 \times 10-3$ g/L.

The above-described ink sets demonstrate good color reproducibility in a high-chroma and low-lightness region despite the fact that the coloring materials have a comparatively low concentration. Therefore, it is not necessary to increase the concentration of coloring materials such as pigments, and the ink set can be also advantageously used for an ink-jet method, without increasing the ink viscosity.

Furthermore, because of the above-described features of the ink set in accordance with the invention, a wetting agent can be added in a sufficient amount to the magenta ink. Therefore, even when an ink-jet ejection device is used, the recording head is prevented from clogging.

According to another aspect of the invention, provided is a recording method for forming images by using the ink set in accordance with the invention. With this recording method, good recorded images with increased luster and excellent color reproducibility in a high-chroma and low-lightness red region can be obtained.

According to another aspect of the invention, provided is a recording system for forming images by using the ink set in accordance with the invention. With this recording system, good recorded images with increased luster and excellent color reproducibility in a high-chroma and low-lightness red region can be obtained.

According to another aspect of the invention, also provided is a recorded matter where images have been formed by using this ink set. This recorded matter is of high quality, excels in color reproducibility in a high-chroma and low-lightness red region and also has increased luster.

Furthermore, the results of the comprehensive study conducted by the inventors demonstrated that a magenta ink comprising C. I. Pigment Violet 32 and C. I. Pigment Violet 19 as coloring materials has excellent color reproducibility in a high-chroma and low-lightness region even at a comparatively low pigment concentration.

According to another aspect of the invention based on this finding, provided is an ink set comprising a magenta ink wherein when the a* value in accordance with the CIE standard that is calculated from a visible absorption spectrum is 80 in a diluted aqueous solution with a dilution ratio of 10,000 or less, the b* value is −38 or more to −29 or less. It is further preferable that the L* value of this magenta ink be 60 or less.

Furthermore, in addition to the above-described conditions, it is preferable that the a* value in accordance with the CIE standard that is calculated from a visible absorption spectrum be 5 or more, preferably 7 or more in a diluted aqueous solution with a pigment concentration of $2 \times 10-3$ g/L.

All the above-described ink sets demonstrate excellent color reproducibility in a high-chroma and low-lightness region despite a comparatively low concentration of coloring material and they do not require the increased concentration of coloring materials such as pigment. Therefore, the ink set can be also advantageously used for an ink-jet method, without increasing the ink viscosity.

Furthermore, because of the above-described features of the ink set in accordance with the invention, a wetting agent can be added in a sufficient amount to the magenta ink. Therefore, even when an ink-jet ejection device is used, the head can be prevented from clogging.

According to another aspect of the invention, provided is a recording method for forming images by using the ink set in accordance with the invention. With this recording method, good recorded images with increased luster and excellent granularity and color reproducibility in a high-chroma and low-lightness red region can be obtained.

According to another aspect of the invention, provided is a recording system for forming images by using the ink set in accordance with the invention. With this recording system, good recorded images with increased luster and excellent granularity and color reproducibility in a high-chroma and low-lightness red region can be obtained.

According to another aspect of the invention, provided is a recorded matter where images have been formed by using this ink set. This recorded matter is of high quality, excels in color reproducibility in a high-chroma and low-lightness red region and also has excellent granularity and increased luster.

BRIEF DESCRIPTION OF THE DRAWINGS

FIG. 6 is a graph illustrating the relationship between L* values and a* values of magenta inks with pigments of different types;

DESCRIPTION OF EXEMPLARY EMBODIMENTS

Figure 1:
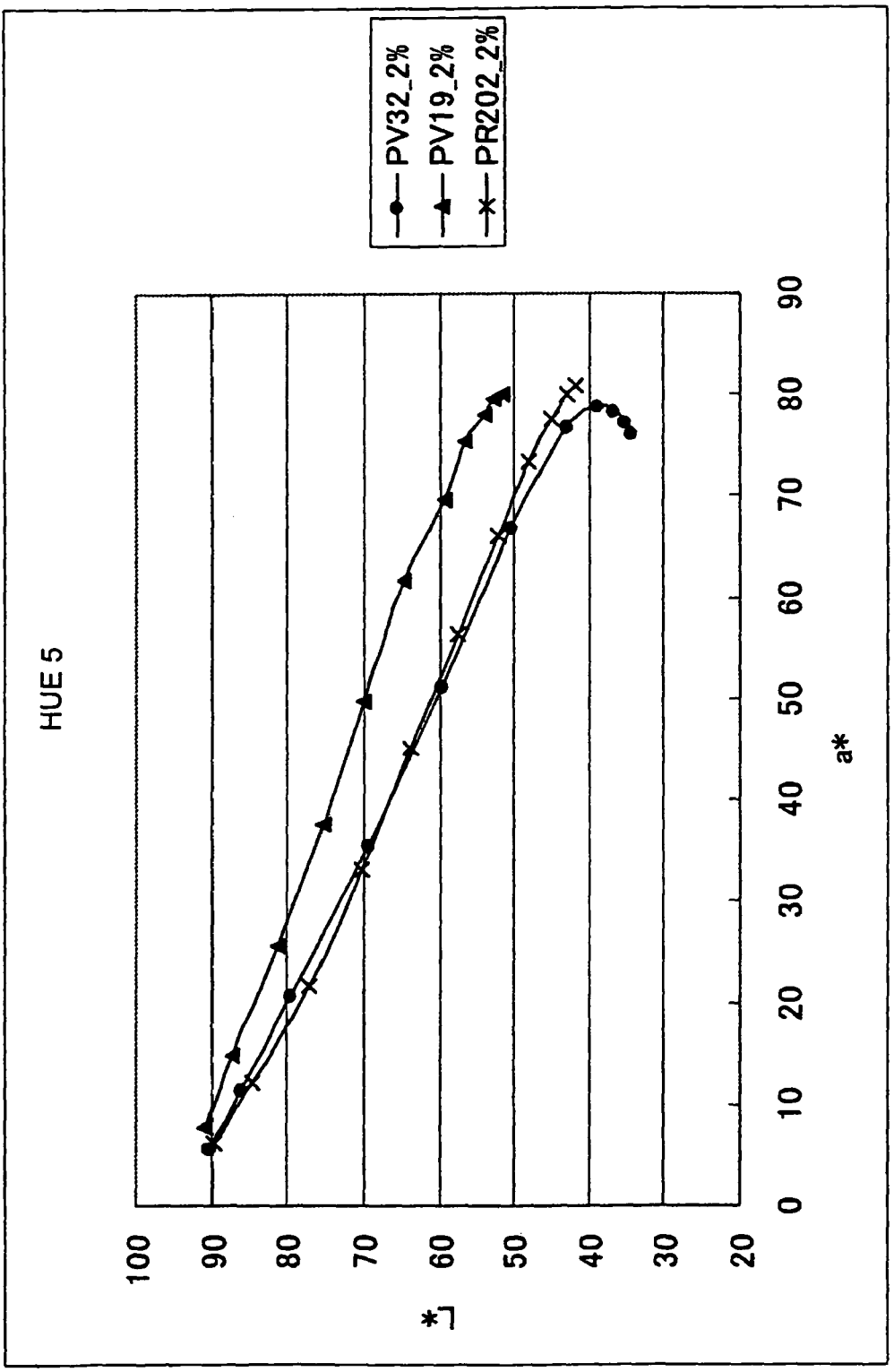
FIG. 1 is a graph illustrating the relationship between L* values and a* values of magenta inks with pigments of different types.

Magenta Ink Composition of the First Embodiment

The magenta ink composition (first embodiment) in accordance with the invention will be described below based on preferred embodiments thereof.

In the magenta ink composition in accordance with the invention, as described hereinabove, when the a* value in accordance with the CIE standard that is calculated from a visible absorption spectrum is 80 in a diluted aqueous solution with a dilution ratio of 10,000 or less, the b* value is −29 or less, preferably the b* value is −35 or less. Such magenta ink excels in color reproducibility in a ultraviolet region, the sRGB color space, which is brightness system coloring, can be color reproduced in a wide range on a recording medium, and the ink can be advantageously used for Desktop Publishing (DTP). On the other hand, if the b* value becomes −40 or less, the coloring ability of red color deteriorates. For this reason, the b* value is preferably −40 or more.

Furthermore, in the magenta ink composition in accordance with the invention, in addition to the condition relating to b* value, it is preferred that the L* value be 60 or less. With such a structure, color reproduction in a high-chroma and low-lightness region is possible.

The L* value, a* value, and b* value in accordance with the CIE standard that are calculated from the visible absorption spectrum can be obtained by transmittance measurements carried out by using, e.g., a device U3300 manufactured by Hitachi Ltd. at a scan speed of 600 nm/min, measurement wavelength range 380-800 nm, and slit width 2.0 nm and conducting calculations at a view angle of 2° with a D65 light source (same for other inks).

Furthermore, the magenta ink composition in accordance with the invention preferably has the a* value in accordance with the CIE standard that is calculated from a visible absorption spectrum of 7 or more in a diluted aqueous solution with a pigment concentration of 2×10−3 g/L. In particular, from the standpoint of color reproducibility of a high-chroma region, the a* value is preferably 8 or more, even more preferably 9 or more. In the magenta ink composition in accordance with the invention, the a* value is 7 or more in the case of concentration of 2×10−3 g/L, but the a* value may be 7 or more at other concentrations. The a* value can be also obtained by a method similar to the above-described measurement method.

The magenta ink composition in accordance with the invention preferably comprises C. I. Pigment Violet 32 (sometimes abbreviated hereinbelow as "PV32") as the pigment. The PV32 can provide sufficient color reproducibility at a comparatively low concentration in a high-chroma and low-lightness region. The concentration of the PV32 is 4 wt. % or less, preferably 2 wt. % or less to prevent the viscosity of the ink from being too high.

When the a* value in accordance with the CIE standard that is calculated from the visible absorption spectrum is 80 in a diluted aqueous solution with a dilution ratio of 10,000 or less of the magenta ink in accordance with the invention, the PV32 may be absent, provided that the b* value is −29 or less. For example, C. I. Pigments Red (sometimes abbreviated hereinbelow as "PR") 5, 7, 12, 48 (Ca), 48 (Mn), 57 (Ca), 57:1, 112, 122, 123, 168, 184, 202, 207, 209, and C. I. Pigment Violet (sometimes abbreviated hereinbelow as "PV") 19 can be contained individually or in combinations of two or more thereof. Those pigments may be also combined with PV32.

The magenta ink in accordance with the invention preferably comprises an organic solvent with a high boiling point in an amount of 14-30 wt. % as a wetting agent. Because the magenta ink in accordance with the invention makes it possible to obtain the target color reproducibility even at a comparatively low pigment concentration, a sufficient amount of organic solvent with a high boiling point can be added without increasing the viscosity. When an organic solvent with a high boiling point is added in the case of applications for ink jet recording, the ink is prevented from drying and clogging of the ink-jet printer head is inhibited. Examples of organic solvents with a high boiling point include polyhydric alcohols such as ethylene glycol, diethylene glycol, triethylene glycol, polyethylene glycol, polypropylene glycol, propylene glycol, butylene glycol, 1,2,6-hexane triol, thioglycol, hexylene glycol, glycerin, trimethylolethane, and trimethylolpropane, alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether, organic alkalis such as urea, 2-pyrrolidone, N-methyl-2-pyrrolidone, 1,3-dimethyl-2-imidazolidinone, and triethanolamine, and saccharides such as sugar alcohol. Those solvents are used individually or in combinations of two or more thereof.

In particular, in order to prevent clogging and increase luster of the recorded image, it is preferred than the magenta ink composition in accordance with the invention has glycerin added thereto at a ratio of 14 wt. % or more. An organic alkali such as triethanolamine may be added together with glycerin. Triethanolamine also can function as a pH adjusting agent and dispersion stabilizer for the ink and is preferably used within a range of 0.1 to 10 wt. % in the ink.

The magenta ink composition in accordance with the invention preferably uses a pigment as a coloring material and comprises a dispersant for dispersing the pigment. Any dispersant that can be used with the pigment ink of this type can be employed without any limitation. Examples of suitable dispersants include cationic dispersants, anionic dispersant, and nonionic dispersants of surfactants. Examples of anionic dispersants include polyacrylic acid, polymethacrylic acid, acrylic acid-acrylonitrile copolymer, vinyl acetate-acrylic acid ester copolymer, acrylic acid-acrylic acid alkyl ester copolymer, styrene-acrylic acid copolymer, styrene-methacrylic acid copolymer, styrene-acrylic acid-acrylic acid alkyl ester copolymer, styrene-methacrylic acid-acrylic acid alkyl ester copolymer, styrene-α-methylstyrene-acrylic acid copolymer, styrene-α-methylstyrene-acrylic acid-acrylic acid alkyl ester copolymer, styrene-maleic acid copolymer, vinyl naphthalene-malefic acid copolymer, vinyl acetate-ethylene copolymer, vinyl acetate-fatty acid vinyl ethylene copolymer, vinyl acetate-maleic acid ester copolymer, vinyl acetate-crotonic acid copolymer, and vinyl acetate-acrylic acid copolymer. Furthermore, examples of anionic surfactants include sodium dodecylbenzene sulfonate, sodium laurate, and ammonium salts of polyoxyethylene alkyl ether sulfate, and examples of nonionic surfactants include polyoxyethylene alkyl ether, polyoxyethylene alkyl ester, polyoxyethylene sorbitan fatty acid ester, polyoxyethylene alkyl phenyl ether, polyoxyethylene alkylamine, and polyoxyethylene alkylamide. Those dispersants can be used individually or in combinations of two or more thereof. From the standpoint of dispersion stability of the pigment, styrene (meth) acrylic acid copolymers are preferred.

The dispersant is contained in the ink composition usually at 140 wt. % or less, calculated as solids, based on the weight of the pigment.

The dispersant is preferably contained at 10-140 wt. %, even more preferably 10-100 wt. %, and even more preferably 10-40 wt. %, calculated as solids, based on the weight of the pigment. The content ratio of the dispersant in the ink is preferably 0.1-10 wt. %, more preferably 0.3-3 wt. %, calculated as solids.

Furthermore, from the standpoint of increasing the ability to wet a recording medium and permeation ability of ink, the magenta ink composition in accordance with the invention preferably contains a permeation enhancer. Examples of permeation enhancers include alcohols such as methanol, ethanol, and iso-propyl alcohol, lower alkyl ethers of polyhydric alcohols such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether, and diols such as 1,2-pentanediol and 1,2-hexanediol. Those enhancers can be used individually or in combinations of two or more thereof. It is preferred that diethylene glycol monobutyl ether, triethylene glycol monobutyl ether, or 1,2-hexanediol, or combinations of two or more thereof be used. The permeation enhancer is contained preferably at a ratio of 1-20 wt. %, more preferably 1-10 wt. % in the ink.

Furthermore in order to increase the ability of the magenta ink composition in accordance with the invention to wet a recording medium and permeation ability of ink similarly to the permeation enhancer, various surfactants such as anionic surfactants, nonionic surfactants, cationic surfactants, and amphoteric surfactants can be used. It is especially preferred that acetylene glycol compound or silicon compounds be used. Commercially available compounds can be used as the acetylene glycol compounds. Examples of such compounds include Olfine Y and Surfynol 82, 440, 465, 485 (all are the trade names, manufactured by Air Products and Chemicals Co., Ltd.), Olfine STG, Olfine E1010 (both are trade names, manufactured by Nisshin Chemical Co., Ltd). Those compounds can be used individually or in combinations of two or more thereof. It is especially preferred that Olfine E1010 and Surfynol 465 be used. Furthermore, polysiloxane compounds such as BYK347, 348 or BYKUV3510 (manufactured by BYK Chemie Japan Co., Ltd.), which are commercial products, can be used as silicone compounds. The content ratio of the acetylene glycol compound and/or silicon compound is preferably 0.01-5 wt. %, more preferably 0.1-1.0 wt. %, and even more preferably 0.1-0.5 wt. %.

In order to shorten the drying time of ink, the magenta ink composition in accordance with the invention can comprise an organic solvent with a low boiling point. Examples of organic solvents with a low boiling point include methanol, ethanol, n-propyl alcohol, iso-propyl alcohol, n-butanol, sec-butanol, tert-butanol, iso-butanol, and n-pentanol. Those solvents can be used individually or in combinations of two or more thereof. Monohydric alcohols are especially preferred.

The magenta ink composition in accordance with the invention comprises the above-described components, such as pigment, dispersant, organic solvent with a high boiling point, permeation enhancer, acetylene glycol compound, and/or silicon compound and usually contains water as the balance. Pure water or ultrapure water such as ion exchange water, reverse osmosis water, ultra-filtrated water, and distilled water is preferred as the water. In particular, water obtained by sterilizing the above-mentioned water by ultraviolet radiation or addition of hydrogen peroxide is especially preferred because it prevents the appearance of mold or bacteria over a long period.

If necessary, the magenta ink composition in accordance with the invention can additionally comprise additives such as a fixing agent such as water-soluble rosin, an antiseptic and a bactericidal agent such as sodium benzoate, an antioxidant and a UV absorber such as allophanates, a chelating agent, an oxygen absorber, and a pH adjusting agent. Those additives may be used individually or in combinations of two or more thereof.

The magenta ink composition in accordance with the invention can be prepared in the same manner as the conventional pigment inks by using the conventional well-known equipment, for example, a ball mill, a sand mill, an attritor, a basket mill, or a roll mill. In the preparation process, coarse particles can be removed by using a membrane filter or a mesh filter.

No specific limitation is placed on the application of the magenta ink composition in accordance with the invention, but it is preferably used in an ink-jet recording method, which is a recording method in which fine droplets of an ink are ejected from a nozzle and the droplets are caused to adhere to a recording medium to form the images of letters or figures. It is especially preferred that the magenta ink composition in accordance with the invention be used for on-demand ink-jet recording. Examples of on-demand ink-jet recording methods include a piezoelectric element recording method bywhich recording is conducted by using piezoelectric elements disposed in a printer head and a thermal heat recording method by which recording is conducted by using thermal energy, e.g., of a heater with a heat-generating resistance element disposed in a printer head. The magenta ink composition in accordance with the invention can be advantageously used in any such ink-jet recording method.

The magenta ink composition in accordance with the invention can be employed, without limitations, with recording media that are usually used for ink-jet recording methods as a recording media for forming images, and it is preferably employed with the media having a coating layer or the usual paper (recording media in which fibers are exposed on the recording surface). In particular, if the magenta ink composition in accordance with the invention is employed on a media having a coating layer, then a significant suppression of granular appearance caused by dot representation during image formation can be obtained.

In the present specification, "media having a coating layer" means all the media where the surface (recording surface) where animate is formed by using the above-described magenta ink composition is covered at least with a coating layer. The media having a coating layer usually has a luster at 85° of 120 or less. Here, the luster at 85° is measured with "PG1M" manufactured by Nippon Denshoku Kogyo K. K. For the measurements, the measurement device is adjusted in advance so as to obtain a 85° luster of a standard luster plate of 100.

Mirror-finish media with a 85° luster of 70-120, for example, media having a resin coat layer where the contour of an image of a fluorescent lamp can be visually confirmed when the media is illuminated with the fluorescent lamp from a distance of 1 m or more can be used as such media having a coating layer. "PGPP (Premium Glossy Photo Paper) manufactured by Seiko-Epson Co., Ltd. which has a 85° luster of 81 is a representative example of such media.

Other examples of media having a coating layer include semigloss media with a 85° luster of 10-70 and a matted media with a 85° luster of 10 or less.

Magenta Ink Composition of the Second Embodiment

The magenta ink composition (second embodiment) in accordance with the invention will be described below based on preferred embodiments thereof.

In the magenta ink composition in accordance with the invention, as described hereinabove, when the. a* value in accordance with the CIE standard that is calculated from a visible absorption spectrum is 80 in a diluted aqueous solution with a dilution ratio of 10,000 or less, the b* value is −38.or more to −29 or less, preferably the b* value is −38 or more to -33 or less. Such magenta ink excels in color reproducibility in a ultraviolet region, the sRGB color space, which is brightness system coloring, can be color reproduced in a wide range on a recording medium, and the ink can be advantageously used for Desktop Publishing (DTP). On the other hand, if the b* value becomes less than −38, the coloring ability of red color deteriorates.

Furthermore, in the magenta ink composition in accordance with the invention, in addition to the condition relating to b* value, it is preferred that the L* value be 60 or less when the a* value in accordance with the CIE standard that is calculated from a visible absorption spectrum in a diluted aqueous solution with a dilution ratio of 10,000 or less is 80. With such a structure, color reproduction in a high-chroma and low-lightness region is possible.

The L* value, a* value, and b* value in accordance with the CIE standard that are calculated from the visible absorption spectrum can be obtained by transmittance measurements carried out by using, e.g., a device U3300 manufactured by Hitachi Ltd. at a scan speed of 600 nm/min, measurement wavelength range 380-800 nm, and slit width 2.0 nm and conducting calculations at a view angle of 2° with a D65 light source.

Furthermore, the magenta ink composition in accordance with the invention preferably has the a* value in accordance with the CIE standard that is calculated from a visible absorption spectrum of 5 or more, more preferably 7 or more, in a diluted aqueous solution with a pigment concentration of 2×10−3 g/L. In particular, from the standpoint of color reproducibility of a high-chroma region, the a* value is preferably 8 or more, even more preferably 9 or more. The a*.value can be also obtained by a method similar to the above-described measurement method.

The magenta ink composition in accordance with the invention preferably comprises C. I. Pigment Violet 32 (PV32) and C. I. Pigment Violet 19 as pigments. In this case, the magenta ink composition in accordance with the invention can provide sufficient color reproducibility at a comparatively low concentration of PV32 and PV19 with respect to a high-chroma and low-lightness region. The total concentration of the PV32 and PV19 is 4 wt. % or less, preferably 2 wt. % or less to prevent the viscosity of the ink from being too high.

In order to provide for excellent color reproducibility of a high-chroma and low-lightness red region and to obtain excellent granularity, it is preferred that the mixing ratio of C. I. Pigment Violet 32 and C. I. Pigment Violet 19 be 1:2 to 2:1.

As mentioned hereinabove, the magenta ink in accordance with the invention preferably comprises both the PV32 and the PV19, but when a* value in accordance with the CIE standard that is calculated from the visible absorption spectrum is 80 in a diluted aqueous solution with a dilution ratio of 10,000 or less, those pigments are not limiting, provided that the b* value is −38 or more to −29 or less. For example, C. I. Pigments Red 5, 7, 12, 48 (Ca), 48 (Mn), 57 (Ca), 57:1, 112, 122, 123, 168, 184, 202, 207, 209 can be contained individually or in combinations of two or more thereof. Those pigments may be also combined with PV32 and/or PV19.

The magenta ink in accordance with the invention preferably comprises an organic solvent with a high boiling point in an amount of 14-30 wt. % as a wetting agent. Because the magenta ink in accordance with the invention makes it possible to obtain the target color reproducibility even at a comparatively low pigment concentration, a sufficient amount of organic solvent with a high boiling point can be added without increasing the viscosity. When an organic solvent with a high boiling point is added in the case of applications for ink jet recording, the ink is prevented from drying and clogging of the ink-jet printer head is inhibited. Examples of organic solvents with a high boiling point include polyhydric alcohols such as ethylene glycol, diethylene glycol, triethylene glycol, polyethylene glycol, polypropylene glycol, propylene glycol, butylene glycol, 1,2,6-hexane triol, thioglycol, hexylene glycol, glycerin, trimethylolethane, and trimethylolpropane, alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether, organic alkalis such as urea, 2-pyrrolidone, N-methyl-2-pyrrolidone, 1,3-dimethyl-2-imidazolidinone, and triethanolamine, and saccharides such as sugar alcohol. Those solvents are used individually or in combinations of two or more thereof.

In particular, in order to prevent clogging and increase luster of the recorded image, it is preferred than the magenta ink composition in accordance with the invention has glycerin added thereto at a ratio of 14 wt. % or more. An organic alkali such as triethanolamine may be added together with glycerin. Triethanolamine also can function as a pH adjusting agent and dispersion stabilizer for the ink and is preferably used within a range of 0.1 to 10 wt. % in the ink.

The magenta ink composition in accordance with the invention preferably uses a pigment as a coloring material and comprises a dispersant for dispersing the pigment. Any dispersant that can be used with the pigment ink of this type can be employed without any limitation. Examples of suitable dispersants include cationic, anionic, and nonionic polymer dispersants of surfactants. Examples of anionic polymer dispersants include polyacrylic acid, polymethacrylic acid, acrylic acid-acrylonitrile copolymer, vinyl acetate-acrylic acid ester copolymer, acrylic acid-acrylic acid alkyl ester copolymer, styrene-acrylic acid copolymer, styrene-methacrylic acid copolymer, styrene-acrylic acid-acrylic acid alkyl ester copolymer, styrene-methacrylic acid-acrylic acid alkyl ester copolymer, styrene-α-methylstyrene-acrylic acid copolymer, styrene-α-methylstyrene-acrylic acid-acrylic acid alkyl ester copolymer, styrene-maleic acid copolymer, vinyl naphthalene-malefic acid copolymer, vinyl acetate-ethylene copolymer, vinyl acetate-fatty acid vinyl ethylene copolymer, vinyl acetate-maleic acid ester copolymer, vinyl acetate-crotonic acid copolymer, and vinyl acetate-acrylic acid copolymer. Furthermore, examples of anionic surfactants include sodium dodecylbenzene sulfonate, sodium laurate, and ammonium salts of polyoxyethylene alkyl ether sulfate, and examples of nonionic surfactants include polyoxyethylene alkyl ether, polyoxyethylene alkyl ester, polyoxyethylene sorbitan fatty acid ester, polyoxyethylene alkyl phenyl ether, polyoxyethylene alkylamine, and polyoxyethylene alkylamide. Those dispersants can be used individually or in combinations of two or more thereof. From the standpoint of dispersion-stability of the pigment, styrene (meth) acrylic acid copolymers are preferred.

The dispersant is preferably contained at 10-140 wt. %, more preferably 10-100 wt. %, and even more preferably 10-60 wt. %, calculated as solids, based on the weight of the pigment. The content ratio of the dispersant in the ink is preferably 0.1-10 wt. %, more preferably 0.3-3 wt. %, calculated as solids.

Furthermore, from the standpoint of increasing the ability to wet a recording medium and permeation ability of ink, the magenta ink composition in accordance with the invention preferably contains a permeation enhancer. Examples of permeation enhancers include alcohols such as methanol, ethanol, and iso-propyl alcohol, lower alkyl ethers of polyhydric alcohols such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether, and diols such as 1,2-pentanediol and 1,2-hexanediol. Those enhancers can be used individually or in combinations of two or more thereof. It is preferred that diethylene glycol monobutyl ether, triethylene glycol monobutyl ether, or 1,2-hexanediol, or combinations of two or more thereof be used. The permeation enhancer is contained preferably at a ratio of 1-20 wt. %, more preferably 1-10 wt. % in the ink.

Furthermore in order to increase the ability of the magenta ink composition in accordance with the invention to wet a recording medium and permeation ability of ink similarly to the permeation enhancer, various surfactants such as anionic surfactants, nonionic surfactants, cationic surfactants, and amphoteric surfactants can be used. It is especially preferred that acetylene glycol compound or silicon compounds be used. Commercially available compounds can be used as the acetylene glycol compounds. Examples of such compounds include Olfine Y and Surfynol 82, 440, 465, 485 (all are the trade names, manufactured by Air Products and Chemicals Co., Ltd.), Olfine STG, Olfine E1010 (both are trade names, manufactured by Nisshin Chemical Co., Ltd). Those compounds can be used individually or in combinations of two or more thereof. It is especially preferred that Olfine E1010 and Surfynol 465 be used. Furthermore, polysiloxane compounds such as BYK347, 348 or BYKUV3510 (manufactured by BYK Chemie Japan Co., Ltd.), which are commercial products, can be used as silicone compounds. The content ratio of the acetylene glycol compound and/or silicone compound is preferably 0.01-5 wt. %, more preferably 0.1-1.0 wt. %, and even more preferably 0.1-0.5 wt. %.

In order to shorten the drying time of ink, the magenta ink composition in accordance with the invention can comprise an organic solvent with a low boiling point. Examples of organic solvents with a low boiling point include methanol, ethanol, n-propyl alcohol, iso-propyl alcohol, n-butanol, sec-butanol, tert-butanol, iso-butanol, and n-pentanol. Those solvents can be used individually or in combinations of two or more thereof. Monohydric alcohols are especially preferred.

The magenta ink composition in accordance with the invention comprises the above-described components, such as pigment, dispersant, organic solvent with a high boiling point, permeation enhancer, acetylene glycol compound, and/or silicon compound and usually contains water as the balance. Pure water or ultrapure water such as ion exchange water, reverse osmosis water, ultra-filtrated water, and distilled water is preferred as the water. In particular, water obtained by sterilizing the above-mentioned water by ultraviolet radiation or addition of hydrogen peroxide is especially preferred because it prevents the appearance of mold or bacteria over a long period.

If necessary, the magenta ink composition in accordance with the invention can additionally comprise additives such as a fixing agent such as water-soluble rosin, an antiseptic and a bactericidal agent such as sodium benzoate, an antioxidant and a UV absorber such as allophanates, a chelating agent, an oxygen absorber, and a pH adjusting agent. Those additives may be used individually or in combinations of two or more thereof.

The magenta ink composition in accordance with the invention can be prepared in the same manner as the conventional pigment inks by using the conventional well-known equipment, for example, a ball mill, a sand mill, an attritor, a basket mill, or a roll mill. In the preparation process, coarse particles can be removed by using a membrane filter or a mesh filter.

No specific limitation is placed on the application of the magenta ink composition in accordance with the invention, but it is preferably used in an ink-jet recording method, which is a recording method in which fine droplets of an ink are ejected from a nozzle and the droplets are caused to adhere to a recording medium to form the images of letters or figures. It is especially preferred that the magenta ink composition in accordance with the invention be used for on-demand ink-jet recording. Examples of on-demand ink-jet recording methods include a piezoelectric element recording method by which recording is conducted by using piezoelectric elements disposed in a printer head and a thermal heat recording method by which recording is conducted by using thermal energy, e.g., of a heater with a heat-generating resistance element disposed in a printer head. The magenta ink composition in accordance with the invention can be advantageously used in any such ink-jet recording method.

The magenta ink composition in accordance with the invention can be employed, without limitations, with recording media that are usually used for ink-jet recording methods as a recording media for forming images, and it is preferably employed with the media having a coating layer or the usual paper (recording media in which fibers are exposed on the recording surface). In particular, if the magenta ink composition in accordance with the invention is employed on a media having a coating layer, then a significant suppression of granular appearance caused by dot representation during image formation can be obtained.

In the present specification, "media having a coating layer" means all the media where the surface (recording surface) where an image is formed by using the above-described magenta ink composition is covered at least with a coating layer. The media having a coating layer usually has a luster at 85° of 120 or less. Here, the luster at 85° is measured with "PG1M" manufactured by Nippon Denshoku Kogyo K. K. For the measurements, the measurement device is adjusted in advance so as to obtain a 85° luster of a standard luster plate of 100.

Mirror-finish media with a 85° luster of 70-120, for example, media having a resin coat layer where the contour of an image of a fluorescent lamp can be visually confirmed when the media is illuminated with the fluorescent lamp from a distance of 1 m or more can be used as such media having a coating layer. "PGPP (Premium Glossy Photo Paper) manufactured by Seiko-Epson Co., Ltd. Which has a 85° luster of 81 is a representative example of such media.

Other examples of media having a coating layer include semigloss media with a 85° luster of 10-70 and a matted media with a 85° luster of 10 or less.

Ink Cartridge

The ink cartridge in accordance with the invention will be described below.

The first embodiment of the invention is an ink cartridge comprising the magenta ink composition of the above-described first embodiment, that is, an ink cartridge comprising a magenta ink composition in which when the a* value in accordance with the CIE standard that is calculated from a visible absorption spectrum is 80 in a diluted aqueous solution with a dilution ratio of 10,000 or less, the b* value is −29 or less (preferably a magenta ink composition in which when the a* value in accordance with the aforementioned standard is 80, the L* is 60 or less, or a magenta ink composition in which the a* value in accordance with the CIE standard that is calculated from a visible absorption spectrum is 7 or more in a diluted aqueous solution with a pigment concentration of $2 \times 10^{-3}$ g/L). The ink cartridge comprising the magenta ink composition of the first embodiment is especially preferred. The ink cartridge in accordance with the invention is identical to the usual ink cartridge for ink jet recording in all the aspects, except that it uses the above-described magenta ink composition.

The ink cartridge in accordance with the invention makes it possible to obtain images with increased color reproducibility in a high-chroma and low-lightness red region and luster.

The second embodiment of the invention is an ink cartridge comprising the magenta ink composition of the above-described second embodiment, that is, an ink cartridge comprising a magenta ink composition in which when the a* value in accordance with the CIE standard that is calculated from a visible absorption spectrum is 80 in a diluted aqueous solution with a dilution ratio of 10,000 or less, the b* value is −38 or more to −29 or less (preferably a magenta ink composition in which when the a* value in accordance with the aforementioned standard is 80, the L* is 60 or less, or a magenta ink composition in which the a* value in accordance with the CIE standard that is calculated from a visible absorption spectrum is 5 or more in a diluted aqueous solution with a pigment concentration of $2 \times 10^{-3}$ g/L). The ink cartridge comprising the magenta ink composition of the second embodiment is especially preferred. The ink cartridge in accordance with the invention is identical to the usual ink cartridge for ink jet recording in all the aspects, except that it uses the above-described magenta ink composition.

The ink cartridge in accordance with the invention makes it possible to obtain images with increased color reproducibility in a high-chroma and low-lightness red region and also improved granularity and luster.

Recording Method

The recording method in accordance with the invention will be described below.

The first embodiment of the invention is a recording method for forming images by using the magenta ink composition of the above-described first embodiment, that is, a method for forming images by using a magenta ink composition in which when the a* value in accordance with the CIE standard that is calculated from a visible absorption spectrum is 80 in a diluted aqueous solution with a dilution ratio of 10,000 or less, the b* value is −29 or less (preferably a magenta ink composition in which when the a* value in accordance with the aforementioned standard is 80, the L* is 60 or less, or a magenta ink composition in which the a* value in accordance with the CIE standard that is calculated from a visible absorption spectrum is 7 or more in a diluted aqueous solution with a pigment concentration of $2 \times 10^{-3}$ g/L). The recording method employing the magenta ink composition of the first embodiment is especially preferred. The recording method in accordance with the invention is implemented similarly to the usual recording method for ink jet recording, except that it uses the above-described magenta ink composition.

The recording method in accordance with the invention makes it possible to obtain images with increased color reproducibility in a high-chroma and low-lightness red region and luster.

The second embodiment of the invention is a recording method for forming images by using the magenta ink composition of the above-described second embodiment, that is, a method for forming images by using a magenta ink composition in which when the a* value in accordance with the CIE standard that is calculated from a visible absorption spectrum is 80 in a diluted aqueous solution with a dilution ratio of 10,000 or less, the b* value is −38 or more to −29 or less (preferably a magenta ink composition in which when the a* value in accordance with the aforementioned standard is 80, the L* is 60 or less, or a magenta ink composition in which the a* value in accordance with the CIE standard that is calculated from a visible absorption spectrum is 5 or more in a diluted aqueous solution with a pigment concentration of $2 \times 10^{-3}$ g/L). The recording method employing the magenta ink composition of the second embodiment is especially preferred. The recording method in accordance with the invention is identical to the usual recording method for ink jet recording in all the aspects, except that it uses the above-described magenta ink composition.

The recording method in accordance with the invention makes it possible to obtain images with increased color reproducibility in a high-chroma and low-lightness red region and also improved granularity and luster.

In the recording method in accordance with the invention, the image is preferably formed so that the ink weight at Duty 100% is 7-13 mg/inch2.

Furthermore, in the mixed color, an image is preferably formed so that the ink weight at Duty 120% is 8-16 mg/inch2.

In the present specification, "Duty" is represented by the unit of D value defined and calculated by the following formula.

$$D=[(\text{number of actually printed dots})/(\text{longitudinal resolution} \times \text{lateral resolution})] \times 100.$$

The Duty 100% means the maximum weight of ink of one color for one pixel.

Recording System

The invention relates to a recording system for forming images by using the above-described magenta ink composition, and a recording system, e.g., a recording device such as an ink-jet printer, that uses the magenta ink compositions of the above-described embodiments is especially preferred.

Recorded Matter

The invention relates to a recorded matter where images are formed by using the above-described magenta ink compositions, and a recorded matter where images are formed by using the magenta ink compositions of the above-described embodiments is especially preferred.

Ink Set of the First Embodiment

The ink set (first embodiment) in accordance with the invention will be explained below based on the preferred mode of implementation thereof.

The ink set in accordance with the invention, as described hereinabove, comprises the magenta ink composition of the above-described first embodiment, that is, a magenta ink composition in which when the a* value in accordance with the CIE standard that is calculated from a visible absorption spectrum is 80 in a diluted aqueous solution with a dilution ratio of 10,000 or less, the b* value is −29 or less, preferably −35 or less. Such magenta ink excels in color reproducibility in a ultraviolet region, the SRGB color space, which is brightness system coloring, can be color reproduced in a wide range on a recording medium, and the ink can be advantageously used for Desktop Publishing (DTP). On the other hand, if the b* value becomes −40 or less. For this reason, the b* value is preferably −40 or more.

In addition to the above-described condition relating to the b* value, the L* value of the magenta ink composition in accordance with the invention is preferably 60 or less. With such a feature, color reproduction is possible in a high-chroma and low-lightness region.

The methods for measuring and calculating the L* value, a* value, and b* value in accordance with the CIE standard that are calculated from a visible absorption spectrum are identical to those of the magenta ink composition of the above-described first embodiment.

It is preferred that the ink set in accordance with the invention comprises magenta ink in which the a* value in accordance with the CIE standard that is calculated from a visible absorption spectrum is 7 or more in a diluted aqueous solution with a pigment concentration of 2×10−3 g/L. From the standpoint of color reproducibility in a high-chroma red region, the a* value is more preferably 8 or more, even more preferably 9 or more. In the magenta ink contained in the ink set in accordance with the invention, the a* value is 7 or more in the case of aqueous solution with a concentration of 2×10−3 g/L, and the a* value may be 7 or more also in the case of aqueous solution with different concentration.

The magenta in contained in the ink set in accordance with the invention preferably comprises C. I. Pigment Violet 32 (PV32) as a pigment. The magenta ink comprising PV32 makes it possible to obtain a sufficient color reproducibility in a high-chroma and low-lightness red area even at a comparatively low concentration. The concentration of PV32 is 4 wt. % or less, preferably 2 wt. % or less so that the ink viscosity does not become too high.

The magenta ink contained in the ink set in accordance with the invention may comprise no PV32, as long as the b* value is −29 or less when the a* value in accordance with the CIE standard that is calculated from a visible absorption spectrum is 80 in a diluted aqueous solution with a dilution ratio of 10,000 or less. For example, For example, C. I. Pigments Red 5, 7, 12, 48 (Ca), 48 (Mn), 57 (Ca), 57:1, 112, 122, 123, 168, 184, 202, 207, 209, and C. I. Pigment Violet 19 may be contained individually or in combinations of two or more thereof. Those pigments may be also combined with PV32.

For the same reasons as were described with respect to the magenta ink composition of the first embodiment, the magenta ink contained in the ink set in accordance with the invention preferably comprises glycerin and an organic solvent with a high boiling point as a wetting agent. The organic solvent with a high boiling point, glycerin, and the content thereof in the magenta ink are identical to those explained with respect to the magenta ink composition of the first embodiment. Therefore, those matters can be similarly employed in the ink set in accordance with the invention.

In addition to the magenta ink (M), the ink set in accordance with the invention preferably comprises a yellow ink (Y) and cyan ink (C). Such YMC ink has especially good color reproducibility in a high-chroma and low-lightness red region.

Pigments are preferred as coloring materials (coloring agents) of the yellow ink and cyan ink because of excellent image fastness of the recorded matter. Inorganic pigments and organic pigments can be used as the pigments, and they can be used individually or in mixture of two or more thereof. For example, titanium oxide, iron oxide and also carbon black manufactured by a well-known method such as a contact method, a furnace method, and a thermal method can be used as the inorganic pigments. An azo pigment (including azo lake, an insoluble azo pigment, a condensated azo pigment, and a chelate, azo pigment), a polycyclic pigment (for example, a phthalocyanine pigment, a perylene pigment, a perinone pigment, an anthraquinone pigment, a quinacridone pigment, a dioxazine pigment, a thioindigo pigments, an isoindolinone pigment, and a quinofuralone pigment), a dye chelate (for example, a basic dye chelate and an acidic dye chelate), a nitro pigment, a nitroso pigment, and aniline black can be used as the organic pigment.

The pigment concentration of the yellow ink is preferably 5.5 wt. % or less and the pigment concentration of the cyan ink is preferably 4 wt. % or less. Decreasing the total pigment concentration of the ink set makes it possible to increase luster in the case of recording mixed colors of each ink on a lustrous medium.

For example, PY74, 93, 109, 110, 128, 138, 150, 151, 154, 155, 180, 185 can be used as the pigment of the yellow ink contained in the ink set in accordance with the invention, and the PY74 is preferred among them. The PY74 can provide for high-lightness and high-chroma color reproduction on the b* axis in a lustrous recording medium even at a low pigment concentration.

On the other hand, at least one pigment selected from C. I. Pigment Blue 1, 2, 3, 15:3, 15:4, 15:34, 16, 22, 60 and C. I. Vat Blue 4, 60 can be used as the pigment of the cyan ink contained in the ink set in accordance with the invention. Among them, C. I. Pigment Blue 15:3 is preferred. If the PB15:3 is combined with the magenta ink in accordance with the invention, then high-lightness and high-chroma color-reproduction on the b* axis in a lustrous recording medium is possible even at a low content of pigment solids.

Furthermore, in addition to the YMC ink, the ink set in accordance with the invention can comprise a black ink such as photoblack ink (PK) and/or matt black ink (MK). As a result, in addition to the above-described effects, an ink set with good black coloring can be obtained. Furthermore, because black us used more often than other colors, the advantage of providing it separately form the YMC ink, is that only the black ink can be replenished.

Examples of coloring materials suitable for the black ink used in accordance with the invention include inorganic pigments such as iron oxide pigments and carbon black (C. I. Pigment Black 7) such as furnace black, lamp black, acetylene black, and channel black and organic pigments such as aniline black (C I. Pigment Black 1). Among those pigments, carbon black is especially preferred, examples of preferred carbon black include No. 2300, No. 900, MCF88, No. 33, No, 40, No, 52, MA7, MA8, MA100, No. 2200 manufactured by Mitsubishi Chemical Co., Raven 5750, Raven 5250, Raven 5000, Raven 3500, Raven 1255, Raven 700 manufactured by Columbia Co., Ltd. Regal 400R, Regal 400R, Regal 1660R, Mogul 1, Monarch 700, Monarch 800, Monarch 880, Monarch 900, Monarch 1000, Monarch 1100, Monarch 1300, and Monarch 1400 manufactured by Cabot Corp., Color Black FW1, Color Black FW2, Color Black FW2V, Color Black FW18, Color Black FW200, Color Black S150, Color Black S160, Color Black S 170, Printex 35, Printex U, Printex V, Printex 140U, Special Black 6, Special Black 5, Special Black 4A, and Special Black 4 manufactured by Degussa Co., Ltd. The content of the pigment in the black ink is preferably 0.1-10.0 wt. %, more preferably 1.0-8.0 wt. %.

Furthermore, in addition to the above-described inks, the ink set in accordance with the invention may comprise at least one other ink, for example, a transparent ink or a white ink.

Each ink contained in the ink set in accordance with the invention preferably uses a pigment as a coloring material and comprises a dispersant for dispersing the pigment. Type of the dispersant and the content ratio thereof (calculated as solids) in the ink are identical to those described above with reference to the magenta ink composition of the first embodiment. Therefore, the above-described matters can be similarly employed.

In particular, in the magenta ink, yellow ink, and cyan ink, the dispersants are preferably contained (calculated as solids) at 10-140 wt. %, more preferably 10-100 wt. %, and even more preferably 10-40 wt. % based on the weight of the pigment.

From the standpoint of preventing the inks from drying and the head of the ink jet printer from clogging when the inks contained in the ink set in accordance with the invention are used for ink jet recording, each ink other than the magenta ink preferably comprises an organic solvent with a high boiling point. Examples of solvents with a high boiling point include polyhydric alcohols such as ethylene glycol, diethylene glycol, triethylene glycol, polyethylene glycol, polypropylene glycol, propylene glycol, butylene glycol, 1,2,6-hexane triol, thioglycol, hexylene glycol, glycerin, trimethylolethane, and trimethylolpropane, alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether, organic alkalis such as urea, 2-pyrrolidone, N-methyl-2-pyrrolidone, 1,3-dimethyl-2-imidazolidinone, and triethanolamine, and saccharides such as sugar alcohol. Those solvents are used individually or in combinations of two or more thereof. In order to prevent clogging, stabilize dispersivity of the coloring material, and increase luster of the recorded image, it is preferred that organic alkali such as triethanolamine be added together with glycerin.

The organic solvent with a high boiling point is contained preferably at 0.1-30 wt. %, more preferably 0.5-25 wt. % in each ink.

Of such organic solvents with a high boiling point, triethanolamine can function as a pH adjusting agent and a dispersion stabilizer for the ink. For those functions to be effectively demonstrated, the triethanolamine is preferably used within a range of 0.1 to 10 wt. % in each ink.

Similarly to the above-described magenta ink composition of the first embodiment, each ink contained in the ink set in accordance with the invention can contain a variety of components such as permeation enhancing agent, surfactants, an organic solvent with a low boiling point, and water. Each component contained in each ink contained in the ink set in accordance with the invention, the content thereof, preferred mode of use, contained water, additives that can be contained, method and apparatus for preparation, and applications of the ink set in accordance with the invention, are similar to those explained with reference to the above-described magenta ink composition of the first embodiment. Therefore, the above-described matters can be similarly employed in the ink sets in accordance with the invention.

The ink set in accordance with the invention demonstrates high reliability as an ink set for ink jet recording when it is used for an ink jet recording method as described hereinabove. In particular, using a magenta ink composition in which when the a* value in accordance with the CIE standard that is calculated from a visible absorption spectrum is 80 in a diluted aqueous solution with a dilution ratio of 10,000 or less, the b* value is −29 or less (preferably a magenta ink composition in which when the a* value in accordance with the aforementioned standard is 80, the L* is 60 or less, or a magenta ink composition in which the a* value in accordance with the CIE standard that is calculated from a visible absorption spectrum is 7 or more in a diluted aqueous solution with a pigment concentration of 2×10−3 g/L)as the magenta ink in the ink set provides for excellent color reproducibility in a high-chroma and low-lightness region, and because a sufficient wetting agent can be added, the ink-jet ejection head can be prevented from clogging.

The ink set in accordance with the invention can be employed, without limitations, with recording media that are usually used for ink-jet recording methods as a recording media for forming images, and it is preferably employed with the media having a coating layer or the usual paper (recording media in which fibers are exposed on the recording surface). In particular, if the magenta ink composition in accordance with the invention is employed on a media having a coating layer, then a significant suppression of granular appearance caused by dot representation during image formation can be obtained.

The expression "media having a coating layer" used herein is identical to that employed with reference to the above-described magenta ink composition of the first embodiment and has the same meaning.

Furthermore, the ink set in accordance with the invention can effectively suppress granular appearance caused by dot representation even in low-resolution recording on a medium of a comparatively small size such as a L plate (preferably, a medium comprising a coating layer). Therefore, the ink set in accordance with the invention is especially suitable for media of a comparatively small size such as L plates.

MODIFICATION EXAMPLES

The invention advantageously provides the above-described embodiments, but it is not limited to those embodiments and can be changed in a variety of ways, without departing from the essence thereof.

In the above-described ink set of the first embodiment, the magenta ink preferably contains C. I. Pigment Violet 32, but the ink set of the second embodiment which comprises a magenta ink comprising the C. I. Pigment Violet 32 and C. I. Pigment Violet 19 as the pigments is also preferred. In particular, the combination of the PV32 and PV19 provides for excellent granularity in addition to color reproducibility in a high-chroma and low-lightness region.

Features of the ink set other than the above-described features are identical to those of the above-described embodiments and each described matter can be employed appropriately.

The C. I. Pigment Violet 32 advantageously used in accordance with the invention is by itself and excellent coloring material for realizing high-chroma and low-lightness colors. Because of a high chroma, concentration of the coloring material can be decreased. As a result, a moisture retaining agent can be added in a large quantity and a contribution can be made to reliability improvement of the ink. On the other hand, because the C. I. Pigment Violet 32 has a low lightness, granularity is sometimes reduced, and the invention provides the ink composition additionally comprising C. I. Pigment Violet 19, as a compensation therefore, or the above-described magenta ink composition that employs together the ink compositions comprising those coloring materials (magenta ink compositions of two colors), and ink sets comprising such compositions.

Ink Cartridge

The ink cartridge in accordance with the invention will be described below.

The first embodiment of the invention is an ink cartridge comprising the ink set of the above-described first embodiment, that is, an ink cartridge comprising an ink set comprising a magenta ink composition in which when the a* value in accordance with the CIE standard that is calculated from a visible absorption spectrum is 80 in a diluted aqueous solution with a dilution ratio of 10,000 or less, the b* value is −29 or less (preferably a magenta ink composition in which when the a* value in accordance with the aforementioned standard is 80, the L* is 60 or less, or a magenta ink composition in which the a* value in accordance with the CIE standard that is calculated from a visible absorption spectrum is 7 or more in a diluted aqueous solution with a pigment concentration of 2×10−3 g/L). The ink cartridge comprising the ink set of the first embodiment is especially preferred. The ink cartridge in accordance with the invention is identical to the usual ink cartridge for ink jet recording in all the aspects, except that it uses the ink set comprising the above-described magenta ink composition.

The ink cartridge in accordance with the invention makes it possible to obtain images with increased color reproducibility in a high-chroma and low-lightness red region and luster.

The second embodiment of the invention is an ink cartridge comprising the ink set of the above-described second embodiment, that is, an ink cartridge comprising an ink set comprising a magenta ink composition in which when the a* value in accordance with the CIE standard that is calculated from a visible absorption spectrum is 80 in a diluted aqueous solution with a dilution ratio of 10,000 or less, the b* value is −38 or more to −29 or less (preferably a magenta ink composition in which when the a* value in accordance with the aforementioned standard is 80, the L* is 60 or less, or a magenta ink composition in which the a* value in accordance with the CIE standard that is calculated from a visible absorption spectrum is 5 or more in a diluted aqueous solution with a pigment concentration of $2\times10^{-3}$ g/L). The ink cartridge comprising the magenta ink composition of the second embodiment is especially preferred. The ink cartridge in accordance with the invention is identical to the usual ink cartridge for ink jet recording in all the aspects, except that it uses the ink set comprising the above-described magenta ink composition.

The ink cartridge in accordance with the invention makes it possible to obtain images with increased color reproducibility in a high-chroma and low-lightness red region and also improved granularity and luster.

Recording Method

The first embodiment of the invention is a recording method for forming images by using the ink set of the above-described first embodiment, that is, a method for forming images by using an ink set comprising a magenta ink composition in which when the a* value in accordance with the CIE standard that is calculated from a visible absorption spectrum is 80 in a diluted aqueous solution with a dilution ratio of 10,000 or less, the b* value is −29 or less (preferably a magenta ink composition in which when the a* value in accordance with the aforementioned standard is 80, the L* is 60 or less, or a magenta ink composition in which the a* value in accordance with the CIE standard that is calculated from a visible absorption spectrum is 7 or more in a diluted aqueous solution with a pigment concentration of $2\times10^{-3}$ g/L). The recording method employing the ink set of the first embodiment is especially preferred. The recording method in accordance with the invention is implemented similarly to the usual recording method for ink jet recording, except that it uses the above-described ink set of the first embodiment.

The second embodiment of the invention is a recording method for forming images by using the ink set of the above-described second embodiment, that is, a method for forming images by using an ink set comprising a magenta ink composition in which when the a* value in accordance with the CIE standard that is calculated from a visible absorption spectrum is 80 in a diluted aqueous solution with a dilution ratio of 10,000 or less, the b* value is −38 or more to −29 or less (preferably a magenta ink composition in which when the a* value in accordance with the aforementioned standard is 80, the L* is 60 or less, or a magenta ink composition in which the a* value in accordance with the CIE standard that is calculated from a visible absorption spectrum is 5 or more in a diluted aqueous solution with a pigment concentration of $2\times10^{-3}$ g/L). The recording method employing the ink set of the second embodiment is especially preferred. The recording method in accordance with the invention is identical to the usual recording method for ink jet recording in all the aspects, except that it uses the above-described ink set of the second embodiment.

The recording method in accordance with the invention is especially advantageously an ink jet recording method for forming images with inks of respective colors when droplets of inks of a plurality of colors are ejected and single-color (monochromatic) images are formed on the recording medium and for forming a mixed-color section by at least two inks contained in the ink set when such mixed-color sections (color that cannot be formed by each ink individually) of a color of second or higher order is formed.

With the ink jet recording method in accordance with the invention, an image with further improved high-chroma and low-lightness color reproducibility can be obtained in the red region. Furthermore, in addition, an ink jet recording method for forming mixed color sections with a black ink (PK and/or MK) is also provided.

In the recording method in accordance with the invention, the image is preferably formed so that the ink weight at Duty 100% is 7-13 mg/inch$^2$.

Furthermore, in the mixed color, an image is preferably formed so that the ink weight at Duty 120% is 8-16 mg/inch$^2$.

In the present specification, "Duty" is represented by the unit of D value defined and calculated by the following formula.

$$D=[(\text{number of actually printed dots})/(\text{longitudinal resolution} \times \text{lateral resolution})] \times 100.$$

The Duty 100% means the maximum weight of ink of one color for one pixel.

Recording System

The invention relates to a recording system for forming images by using the above-described ink set, and a recording system, e.g., a recording device such as an ink-jet printer, that uses the ink sets of the above-described embodiments is especially preferred.

Recorded Matter

The invention relates to a recorded matter where images are formed by using the above-described ink sets, and a recorded matter where images are formed by using the ink sets of the above-described embodiments is especially preferred.

The invention provides a magenta ink that excels in color reproducibility in a high-chroma and low-lightness region, does not cause clogging in ink-jet recording heads, and also has increased luster. Furthermore, the invention provides a magenta ink that excels in color reproducibility in a high-chroma and low-lightness region and also in granularity, does not cause clogging in ink-jet recording heads, and also has increased luster. Furthermore, the invention provides an in set for ink-jet recording comprising a magenta ink that excels in color reproducibility in a high-chroma and low-lightness region, does not cause clogging in ink-jet recording heads, and also has increased luster. Furthermore, the invention provides an in set for ink-jet recording comprising a magenta ink that excels in color reproducibility in a high-chroma and low-lightness region and also in granularity, does not cause clogging in ink-jet recording heads, and also has increased luster. In addition, the invention provides an ink cartridge, a recording method, a recording system, and a recorded matter using such magenta inks or ink sets.

The invention will be described below in greater detail with reference to the working examples of the invention and test examples, but the invention is not limited by those working examples.

Working Example A

Preparation of Inks

Magenta ink compositions (M1) and (M2) comprising pigment PV32 were prepared as the magenta ink compositions in accordance with the invention.

| Working Example 1 (M1) | |
|---|---|
| C.I. Pigment Violet 32 | 4.0 wt. % |
| Dispersant (styrene - acrylic acid copolymer) | 2.0 wt. % |
| Glycerin | 14.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |
| Working Example 2 (M2) | |
| C.I. Pigment Violet 32 | 2.0 wt. % |
| Dispersant (styrene - acrylic acid copolymer) | 1.0 wt. % |
| Glycerin | 20.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

Furthermore, a magenta ink composition (m1) containing no PV32 was prepared as a comparative example.

| Comparative Example 1 (m1) | |
|---|---|
| C.I. Pigment Red 202 | 2.0 wt. % |
| Dispersant (styrene - acrylic acid copolymer) | 2.8 wt. % |
| Glycerin | 12.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

The results obtained in measuring the reverse-flow viscosity are shown in Table 1.

TABLE 1

| | M1 | M2 | m1 |
|---|---|---|---|
| Reverse-flow viscosity | 3.6 | 3.6 | 3.6 |

The results obtained demonstrate that though the magenta inks M1 and M2 had a glycerin concentration as high as 14.0 wt. % and 20.0 wt. %, respectively, they had the same viscosity as the magenta ink m1 comprising only 12.0 wt. % of glycerin. This is because the pigment had a low concentration in M1 and M2. However, as described hereinbelow, because the magenta ink composition comprising C. I Pigment Violet 32 has a high chroma, sufficient coloring can be obtained despite the decreased pigment concentration. As a result, a larger quantity of the moisture retaining agent such as glycerin can be added and the resistance to clogging and reliability can be improved.

Evaluation of Resistance to Clogging

Resistance to clogging was evaluated for the magenta inks M1 and M2 comprising PV32 (working examples) and magenta ink m1 containing no PV32 (comparative example).

Ink cartridges filled with respective inks were prepared, and heads were filled with the inks by using the ink cartridges in the entire row of unused ink-jet printers PX-G900 (manufactured by Seiko Epson Co.). Then, nozzle check was conducted by using a printer driver to verify whether an abnormality has occurred.

The ink cartridges were then removed, the heads were removed from the printers, and the heads were allowed to stay for 10 days in a thermostat at 40° C. and a moisture content of 20%. After 10 days, the head and ink cartridges were mounted on the printers and nozzle check was carried out by using the printer driver.

When an abnormality has occurred, cleaning was conducted by using the printer driver, and nozzle check was then carried out again. When the abnormality was still detected, cleaning and nozzle check were repeated till the results of the nozzle check indicated a normal state.

As a result, the heads in which the entire row was filled with the magenta inks M1 or M2 showed a normal output of nozzle check after no more than five cycles of cleaning. On the other hand, the head in which the entire row was filled with the magenta ink ml did not show a normal output of nozzle check even after five cycles of cleaning. Those results suggested that the magenta inks Ml or M2 have higher resistance to clogging of the head that the magenta ink ml of the conventional example and are suitable for an ink jet method. This is apparently because M1 and M2 could contain glycerin, which serves as a wetting agent, at a high concentration due to a comparatively low pigment concentration.

Measurement of L* Value, a* Value, and b* Value of Magenta Ink in the Case of Variable Duty Inks comprising each of PV32, PV19, and PR202 at 2 wt. %, 4 wt. %, and 6 wt. % were prepared ass magenta inks. The ink compositions are presented in Table 2.

Those inks were printed on media having a coating layer and L* value, a* value, and b* value in accordance with the CIE standard were measured. C* was found from the following formula: $C^*=(a^{*2}+b^{*2})^{1/2}$ using these values, and h was found from the formula $h=\tan^{-1}(b^*/a^*)$.

More specifically, ink-jet printers PM900 (manufactured by Seiko-Epson Co., Ltd.) were filled with magenta inks, and recorded matters were obtained by printing on the above-described PGPP (manufactured by Seiko-Epson Co., Ltd.) as an example of medium having a coating layer. In the course of printing, magenta inks were ejected by changing the Duty from 15% to 255% (ink weight 10-11 mg/inch2).

The L* value, a* value, b* value, C* value, and h value in accordance with the CIE standard were obtained for the printed products thus obtained by conducting measurements with D50 light source at a view angle 2° by using Macbeth SPM50 manufactured by Gretag Co., Ltd. The measurement results are shown in Tables 3 to 11.

TABLE 3

PV32 2%

| Duty | L* | a* | b* | C* | h |
|---|---|---|---|---|---|
| 255 | 34.26 | 76.18 | 5.82 | 76.4 | 4.4 |
| 230 | 35.1 | 77.38 | 1.17 | 77.4 | 0.9 |
| 205 | 36.68 | 78.58 | −6.48 | 78.8 | −4.7 |
| 180 | 38.67 | 79.05 | −14.34 | 80.3 | −10.3 |
| 155 | 43.02 | 76.88 | −20.91 | 79.7 | −15.2 |
| 130 | 50.21 | 66.96 | −23.8 | 71.1 | −19.6 |
| 105 | 59.49 | 51.22 | −22.32 | 55.9 | −23.5 |
| 80 | 69.26 | 35.53 | −18.29 | 40.0 | 27.2 |
| 55 | 79.47 | 20.79 | −12.68 | 24.4 | −31.4 |
| 30 | 86.16 | 11.43 | −8.85 | 14.5 | −37.7 |
| 15 | 90.26 | 5.82 | −6.42 | 8.7 | −47.8 |

TABLE 4

PV32 4%

| Duty | L* | a* | b* | C* | h |
|---|---|---|---|---|---|
| 255 | 30.09 | 69.36 | 31.76 | 76.3 | 24.6 |
| 230 | 30.67 | 70.28 | 28.43 | 75.8 | 22.0 |
| 205 | 31.6 | 71.9 | 22.37 | 75.3 | 17.3 |
| 180 | 32.87 | 74.09 | 13.96 | 75.4 | 10.7 |
| 155 | 34.68 | 76.37 | 3.61 | 76.5 | 2.7 |
| 130 | 37.83 | 76.95 | −7.57 | 77.3 | −5.6 |
| 105 | 43.81 | 71.43 | −15.74 | 73.1 | −12.4 |
| 80 | 52.33 | 59.99 | −19.09 | 63.0 | −17.7 |
| 55 | 63.64 | 43.14 | −17.33 | 46.5 | −21.9 |
| 30 | 76.97 | 23.85 | −12.02 | 26.7 | −26.7 |
| 15 | 85.74 | 11.9 | −7.75 | 14.2 | −33.1 |

TABLE 2

| | PV32 2% | PV32 4% | PV32 6% | PV19 2% | PV19 4% | PV19 6% | PR202 2% | PR202 4% | PR202 6% |
|---|---|---|---|---|---|---|---|---|---|
| PV32 | 2.0 | 4.0 | 6.0 | | | | | | |
| PV19 | | | | 2.0 | 4.0 | 6.0 | | | |
| PR202 | | | | | | | 2.0 | 4.0 | 6.0 |
| Dispersant | 1.0 | 2.0 | 3.0 | 1.0 | 2.0 | 3.0 | 2.8 | 5.6 | 8.4 |
| Glycerin | 20.0 | 14.0 | 12.0 | 20.0 | 14.0 | 12.0 | 12.0 | 10.0 | 10.0 |
| 1,2-Hexanediol | 7.0 | 7.0 | 7.0 | 7.0 | 7.0 | 7.0 | 7.0 | 7.0 | 7.0 |
| Triethanolamine | 0.9 | 0.9 | 0.9 | 0.9 | 0.9 | 0.9 | 0.9 | 0.9 | 0.9 |
| BYK348 | 0.1 | 0.1 | 0.1 | 0.1 | 0.1 | 0.1 | 0.1 | 0.1 | 0.1 |
| Ultrapure water | Balance | Balance | Balance | Balance | Balance | Balance | Balance | Balance | Balance |
| Total | 100.0 | 100.0 | 100.0 | 100.0 | 100.0 | 100.0 | 100.0 | 100.0 | 100.0 |

TABLE 5

PV32 6%

| Duty | L* | a* | b* | C* | h |
|---|---|---|---|---|---|
| 255 | 26.58 | 63.58 | 38 | 74.1 | 30.9 |
| 230 | 27.19 | 64.52 | 38.45 | 75.1 | 30.8 |
| 205 | 28.08 | 65.94 | 37.88 | 76.0 | 29.9 |
| 180 | 29.4 | 67.92 | 33.75 | 75.3 | 26.4 |
| 155 | 30.93 | 70.35 | 25.07 | 74.7 | 19.6 |
| 130 | 33.42 | 72.83 | 11.05 | 73.7 | 8.6 |
| 105 | 37.76 | 72.36 | −2.49 | 72.4 | −2.0 |
| 80 | 44.94 | 65.92 | −11.88 | 67.0 | −10.2 |
| 55 | 56.99 | 49.53 | −14.87 | 51.7 | −16.7 |
| 30 | 72.56 | 28.26 | −11.75 | 30.6 | −22.6 |
| 15 | 83.39 | 13.72 | −7.87 | 15.8 | −29.8 |

TABLE 6

PV19_2%

| Duty | L* | a* | b* | C* | h |
|---|---|---|---|---|---|
| 255 | 51.53 | 80.11 | 3.25 | 80.2 | 2.3 |
| 230 | 52.58 | 75.59 | 0.36 | 79.6 | 0.3 |
| 205 | 53.77 | 78.05 | −4.68 | 78.2 | −3.4 |
| 180 | 56.72 | 75.31 | −8.28 | 75.8 | −6.3 |
| 155 | 59.29 | 69.64 | −13.29 | 70.9 | −10.8 |
| 130 | 64.61 | 61.75 | −13.33 | 63.2 | −12.2 |
| 105 | 70.09 | 49.67 | −14.48 | 51.7 | −16.3 |
| 80 | 75.25 | 37.66 | −13.8 | 40.1 | −20.1 |
| 55 | 81.36 | 25.76 | −10.79 | 27.9 | −22.7 |
| 30 | 87.2 | 14.71 | −7.68 | 16.6 | −27.6 |
| 15 | 90.7 | 7.71 | −5.81 | 9.7 | −37.0 |

TABLE 7

PV19_4%

| Duty | L* | a* | b* | C* | h |
|---|---|---|---|---|---|
| 255 | 44.15 | 79.38 | 26.25 | 83.6 | 18.3 |
| 230 | 44.78 | 79.83 | 22.6 | 83.0 | 15.8 |
| 205 | 45.84 | 80.51 | 16.54 | 82.2 | 11.6 |
| 180 | 47.23 | 80.88 | 8.75 | 81.4 | 6.2 |
| 155 | 49.28 | 81.07 | 0.71 | 81.1 | 0.5 |
| 130 | 52.35 | 78.7 | −7.1 | 79.0 | −5.2 |
| 105 | 56.72 | 72.49 | −12.48 | 73.6 | −9.8 |
| 80 | 62.55 | 62.04 | −14.79 | 63.8 | −13.4 |
| 55 | 71.1 | 45.32 | −13.92 | 47.4 | −17.1 |
| 30 | 81.07 | 25.64 | −10.81 | 27.8 | −22.9 |
| 15 | 87.56 | 12.94 | −7.36 | 14.9 | −29.6 |

TABLE 8

PV19_6%

| Duty | L* | a* | b* | C* | h |
|---|---|---|---|---|---|
| 255 | 43.19 | 76.7 | 32.28 | 83.2 | 22.8 |
| 230 | 43.57 | 76.85 | 28.45 | 81.9 | 20.3 |
| 205 | 44.59 | 77.83 | 22.98 | 81.2 | 16.4 |
| 180 | 46.08 | 79.12 | 16.17 | 80.8 | 11.6 |
| 155 | 48.06 | 80.06 | 7.54 | 80.4 | 5.4 |
| 130 | 50.82 | 78.98 | −1.21 | 79.0 | −0.9 |
| 105 | 55.18 | 73.84 | −8.4 | 74.3 | −6.5 |
| 80 | 61.31 | 63.61 | −12.39 | 64.8 | −11.0 |
| 55 | 70.1 | 47.38 | −12.57 | 49.0 | −14.9 |
| 30 | 80.32 | 27.62 | −9.7 | 29.3 | −19.4 |
| 15 | 87.15 | 13.89 | −6.82 | 15.5 | −26.2 |

TABLE 9

PR202_2%

| Duty | L* | a* | b* | C* | h |
|---|---|---|---|---|---|
| 255 | 41.81 | 81 | −16.23 | 82.6 | −11.3 |
| 230 | 42.9 | 80.07 | −18.86 | 82.3 | −13.3 |
| 205 | 44.86 | 77.58 | −22.51 | 80.8 | −16.2 |
| 180 | 47.93 | 73.33 | −25.93 | 77.8 | −19.5 |
| 155 | 52.11 | 66.15 | −28.02 | 71.8 | −23.0 |
| 130 | 57.55 | 56.34 | −28.08 | 62.9 | −26.5 |
| 105 | 63.69 | 45.19 | −26.19 | 52.2 | −30.1 |
| 80 | 70.34 | 33.13 | −23.05 | 40.4 | −34.8 |
| 55 | 77.18 | 21.78 | −17.83 | 28.1 | −39.3 |
| 30 | 84.67 | 12.2 | −11.83 | 17.0 | −44.1 |
| 15 | 89.56 | 6.13 | −7.72 | 9.9 | −51.5 |

TABLE 10

PR202_4%

| Duty | L* | a* | b* | C* | h |
|---|---|---|---|---|---|
| 255 | 36.25 | 78.56 | 5.95 | 78.8 | 4.3 |
| 230 | 36.95 | 79.32 | 1.98 | 79.3 | 1.4 |
| 205 | 38.19 | 80.18 | −4.1 | 80.3 | −2.9 |
| 180 | 40.19 | 80.82 | −11.67 | 81.7 | −8.2 |
| 155 | 43.04 | 79.31 | −18.61 | 81.5 | −13.2 |
| 130 | 47.18 | 74.34 | −24.43 | 78.3 | −18.2 |
| 105 | 52.72 | 65.11 | −26.9 | 70.4 | −22.4 |
| 80 | 59.9 | 52.12 | −26.08 | 58.3 | −26.6 |
| 55 | 69.57 | 35.63 | −21.9 | 41.8 | −31.6 |
| 30 | 80.27 | 19 | −15.24 | 24.4 | −38.7 |
| 15 | 87.3 | 9.41 | −9.63 | 13.5 | −45.7 |

TABLE 11

PR202_6%

| Duty | L* | a* | b* | C* | h |
|---|---|---|---|---|---|
| 255 | 37.31 | 79.28 | 3.18 | 79.3 | 2.3 |
| 230 | 38.24 | 79.6 | −2.05 | 79.6 | −1.5 |
| 205 | 40.19 | 78.89 | −9.06 | 79.4 | −6.6 |
| 180 | 43 | 76.68 | −15.48 | 78.2 | −11.4 |
| 155 | 47.36 | 70.86 | −20.49 | 73.8 | −16.1 |
| 130 | 54.29 | 59.43 | −22.42 | 63.5 | −20.7 |
| 105 | 63.09 | 44.82 | −21.27 | 49.6 | −25.4 |
| 80 | 71.92 | 30.78 | −18.15 | 35.7 | −30.5 |
| 55 | 81.03 | 17.47 | −12.56 | 21.5 | −35.7 |
| 30 | 87.18 | 8.83 | −8.45 | 12.2 | −43.7 |
| 15 | 90.93 | 4.3 | −6.04 | 7.4 | −54.6 |

FIGS. 1 to 4 show the graphs in which the a* values of Tables 3 to 11 are plotted on the abscissa and the L* values are plotted on the ordinate.

Figure 2:
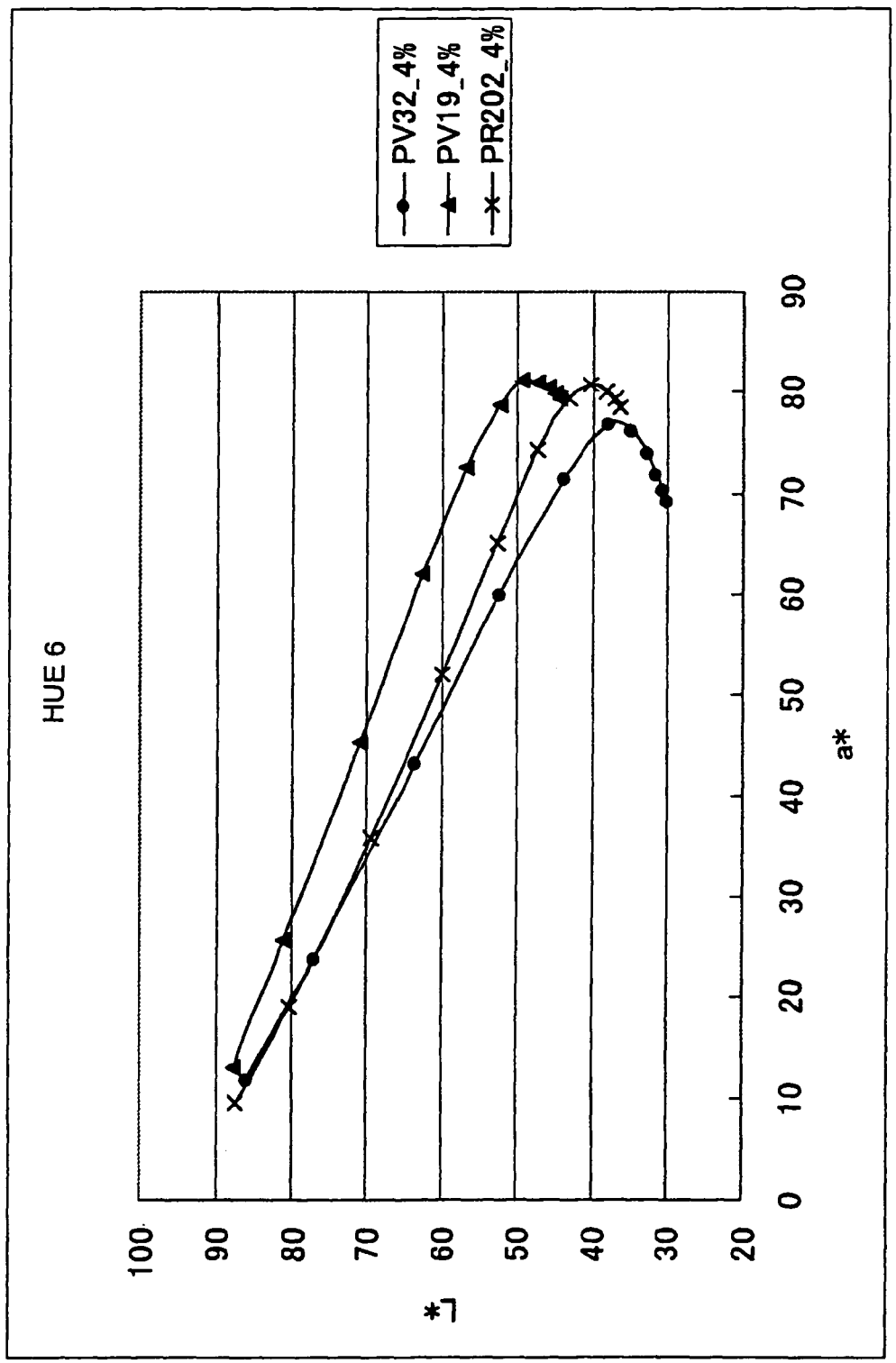
FIG. 2 is a graph illustrating the relationship between L* values and a* values of magenta inks with pigments of different types.
Figure 3:
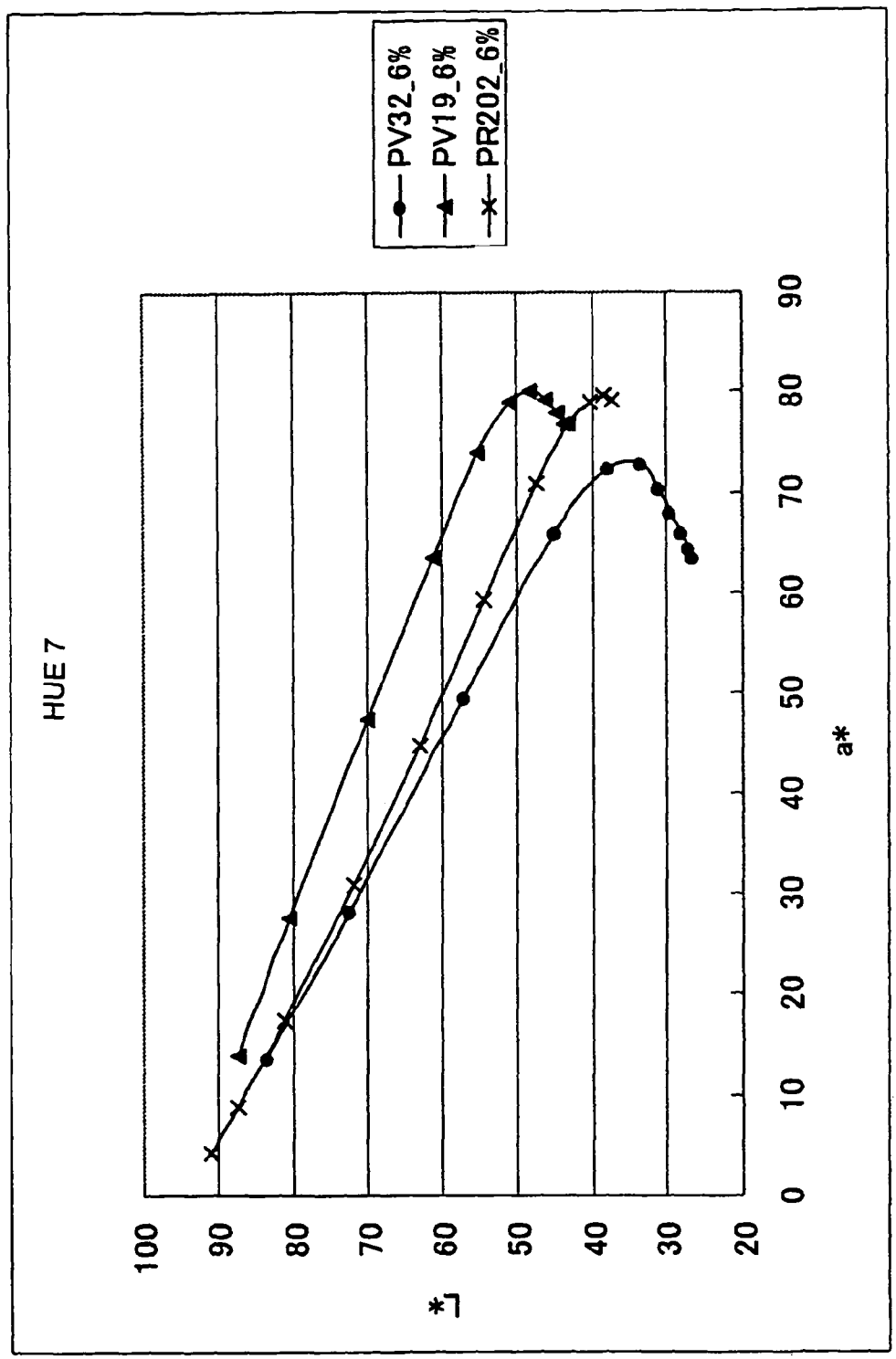
FIG. 3 is a graph illustrating the relationship between L* values and a* values of magenta inks with pigments of different types.
Figure 4:
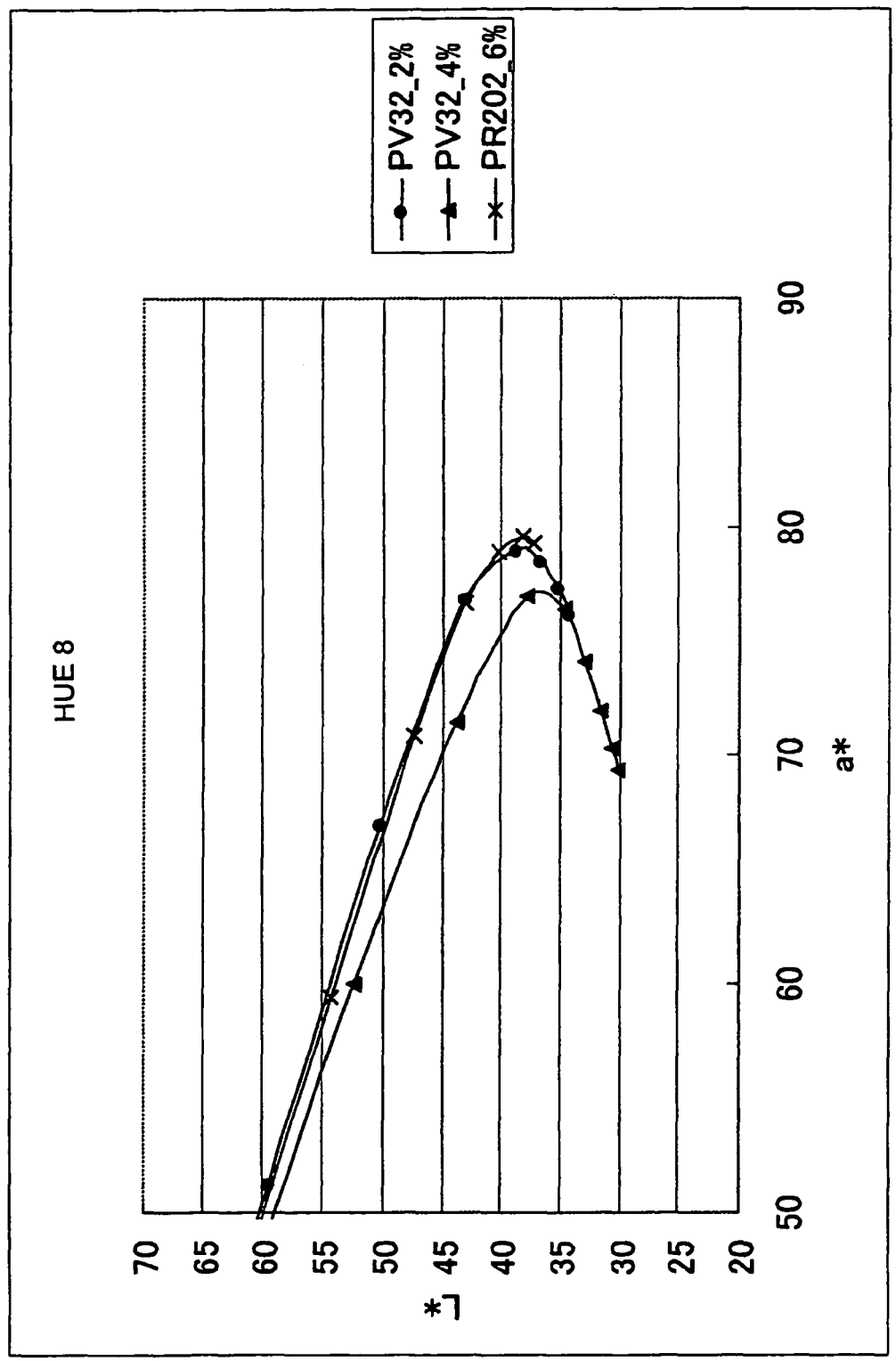
FIG. 4 is a graph illustrating the relationship between L* values and a* values of magenta inks with pigments of different types.

FIGS. 1 to 3 show that the magenta ink comprising PV32 has excellent color reproducibility in a region with a high chroma, which is represented by the a* value, and a low lightness, which is represented by the L* value, at all the concentrations. Furthermore, FIG. 4 demonstrates that the ink comprising PV32, despite a low concentration of 2 wt. %, can provide chroma and lightness identical to those of the ink comprising 6.wt. % of PR202.

Measurement of L*, a*, b* Values of Diluted Aqueous Solution of Magenta Ink

Magenta inks of working examples and comparative examples were prepared so that the pigment concentration of any one type of PV32, PV19, and PR202 was 4 wt. %, and then the.inks were diluted with water to obtain an a* value of 80. The aqueous solution comprising PV32 had to be diluted at a ratio of about 1500, the aqueous solution comprising PV19 had to be diluted at a ratio of about 500, and the aqueous solution comprising PR202 had to be diluted at a ratio of about 660.

Measurements of L* value, a* value, and b* value of each aqueous solution were conducted by using U3300 manufactured by Hitachi Ltd. More specifically, transmittance measurements were carried out at a scan speed of 600 nm/min, a measurement wavelength range of 380-800 nm, and a slit width of 2.0 nm and calculations were conducted for a view angle of 2° and a D65 light source.

The results are shown in Table 12 below. The type and concentration of the pigment are shown in the column at the left side of Table 12. From top to bottom, the data correspond to ink compositions of a working example and two comparative examples.

TABLE 12

| | a*80 | | |
|---|---|---|---|
| | L* | b* | Dilution ratio |
| PV32_4% | 49.51 | −38.60 | About 1500 |
| PV19_4% | 61.04 | −16.72 | About 500 |
| PR202_4% | 50.92 | −28.63 | About 660 |

When the a* value was 80, the L* value was 60 or less (more specifically, 50 or less) and the b* value was −29 or less. Excellent color reproducibility in a high-chroma and low-lightness region was obtained only with the aqueous solution comprising PV32.

Then, aqueous solutions comprising 2% of pigment of one type of PV32, PV19, and PR202 were-prepared and diluted at a ratio of 10,000 to obtain aqueous solutions with a pigment concentration of $2\times10^{-3}$ g/L. L*, a*, and b* values were then measured by the above-described methods. The results are shown in Table 13.

TABLE 13

| | Dilution ratio 10,000 | | |
|---|---|---|---|
| | L* | a* | b* |
| PV32_2% | 93.98 | 9.27 | −6.16 |
| PV19_2% | 97.50 | 5.28 | −1.86 |
| PR202_2% | 97.15 | 3.41 | −2.81 |

The results obtained demonstrated that of the aqueous solutions with a pigment concentration of $2\times10^{-3}$ g/L, the aqueous solution comprising PV 32 had a* value of 7 or more (more specifically, 9 or more) and the best color reproducibility in a high-chroma region.

The above-described results confirmed that the magenta ink in which when the a* value in accordance with the CIE standard that is calculated from a visible absorption spectrum is 80 in a diluted aqueous solution with a dilution ratio of 10,000 or less, the L* value is 60 or less (more specifically 50 or less) and the b* value is −29 or less, and the magenta ink in which the a* value in accordance with the CIE standard that is calculated from a visible absorption spectrum is 7 or more in a diluted aqueous solution with a pigment concentration of $2\times10^{-3}$ g/L have excellent, color reproducibility in a high-chroma and low-lightness region, are rich in luster, and hardly cause any clogging of ink-jet recording heads.

Working Example B

| Working Example 1 (M1) | |
|---|---|
| C.I. Pigment Violet 32 | 2.0 wt. % |
| C.I. Pigment Violet 19 | 2.0 wt. % |
| Dispersant (styrene - acrylic acid copolymer) | 2.0 wt. % |
| Glycerin | 14.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

-continued

| Working Example 2 (M2) | |
|---|---|
| C.I. Pigment Violet 32 | 1.0 wt. % |
| C.I. Pigment Violet 19 | 1.0 wt. % |
| Dispersant (styrene - acrylic acid copolymer) | 1.0 wt. % |
| Glycerin | 20.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

Furthermore, a magenta ink composition (ml) using C. I. Pigment Red 202 (also referred to hereinbelow as PR202) instead of PV32 and PV19 was prepared as a comparative example.

| Comparative Example 1 (m1) | |
|---|---|
| C.I. Pigment Red 202 | 2.0 wt. % |
| Dispersant (styrene - acrylic acid copolymer) | 2.8 wt. % |
| Glycerin | 12.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

The results obtained in measuring the reverse-flow viscosity are shown in Table 14.

TABLE 14

| | M1 | M2 | m1 |
|---|---|---|---|
| Reverse-flow viscosity | 3.6 | 3.6 | 3.6 |

The results obtained demonstrate that though the magenta inks M1 and M2 had a glycerin concentration as high as 14.0 wt. % and 20.0 wt. %, respectively, they. had the same viscosity as the magenta ink m1 comprising only 12.0 wt. % of glycerin. This is because the pigment had a low concentration in M1 and M2. However, as described hereinbelow, because the magenta ink composition comprising C. I Pigment Violet 32 has a high chroma, sufficient coloring can be obtained despite the decreased pigment concentration. As a result, a larger quantity of the moisture retaining agent such as glycerin can be added and the resistance to clogging and reliability can be improved.

Evaluation of Resistance to Clogging

Resistance to clogging was evaluated for the magenta inks M1 and M2 comprising PV32 and PV19 (Working Examples 1 and 2) and magenta ink m1 comprising PR202 (Comparative Example 1).

Ink cartridges filled with respective inks were prepared, and heads were filled with the inks by using the ink cartridges in the entire row of unused ink-jet printers PX-G900 (manufactured by Seiko Epson Co.). Then, nozzle check was conducted by using a printer driver to verify whether an abnormality has occurred.

The ink cartridges were then removed, the heads were removed from the printers, and the heads were allowed to stay for 10 days in a thermostat at 40° C. and a moisture content of 20%. After 10 days, the head and ink cartridges were mounted on the printers and nozzle check was carried out by using the printer driver.

When an abnormality has occurred, cleaning was conducted by using the printer driver, and nozzle check was then carried out again. When the abnormality was still detected, cleaning and nozzle check were repeated till the results of the nozzle check indicated a normal state.

As a result, the heads in which the entire row was filled with the magenta inks M1 or M2 showed a normal output of nozzle check after no more than five cycles of cleaning. On the other hand, the head in which the entire row was filled with the magenta ink ml did not show a normal output of nozzle check after no more than five cycles of cleaning. Those results suggested that the magenta inks M1 or M2 have higher resistance to clogging of the head that the magenta ink m1 of the conventional example and are suitable for an ink jet method. This is apparently because M1 and M2 could contain glycerin, which serves as a wetting agent, at a high concentration due to a comparatively low pigment concentration.

Measurement of L* Value, a* Value, and b* Value of Magenta Ink in the Case of Variable Duty Inks comprising 4 wt. % PV32+PV19 (mixing ratios 1:1, 2:1 and 1:2), an ink comprising 2 wt. % PV32+PV19 (mixing ratios 1:1), an ink comprising 4 wt. % PR202, and inks each comprising 4 wt. % one of PV32 and PV19 were prepared as magenta inks. The ink compositions are presented below.

| PV32 + PV19 (1:1) = total 4 wt. % (Working Example 1) | |
| --- | --- |
| C.I. Pigment Violet 32 | 2.0 wt. % |
| C.I. Pigment Violet 19 | 2.0 wt. % |
| Dispersant (styrene - acrylic acid copolymer) | 2.0 wt. % |
| Glycerin | 14.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

| PV32 + PV19 (1:1) = total 2 wt. % (Working Example 2) | |
| --- | --- |
| C.I. Pigment Violet 32 | 1.0 wt. % |
| C.I. Pigment Violet 19 | 1.0 wt. % |
| Dispersant (styrene - acrylic acid copolymer) | 1.0 wt. % |
| Glycerin | 20.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

| PV32 + PV19 (2:1) = total 4 wt. % (Working Example 3) | |
| --- | --- |
| C.I. Pigment Violet 32 | 2.7 wt. % |
| C.I. Pigment Violet 19 | 1.3 wt. % |
| Dispersant (styrene - acrylic acid copolymer) | 2.0 wt. % |
| Glycerin | 14.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

| PV32 + PV19 (1:2) = total 4 wt. % (Working Example 4) | |
| --- | --- |
| C.I. Pigment Violet 32 | 1.3 wt. % |
| C.I. Pigment Violet 19 | 2.7 wt. % |
| Dispersant (styrene - acrylic acid copolymer) | 2.0 wt. % |
| Glycerin | 14.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

| PR202: 4 wt. % (Comparative Example 1) | |
| --- | --- |
| C.I. Pigment Violet 202 | 4.0 wt. % |
| Dispersant (styrene - acrylic acid copolymer) | 2.8 wt. % |
| Glycerin | 12.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

| PV19: 4 wt. % (Comparative Example 2) | |
| --- | --- |
| C.I. Pigment Violet 19 | 4.0 wt. % |
| Dispersant (styrene - acrylic acid copolymer) | 2.0 wt. % |
| Glycerin | 14.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

| PV32: 4 wt. % (Comparative Example 3) | |
| --- | --- |
| C.I. Pigment Violet 32 | 4.0 wt. % |
| Dispersant (styrene - acrylic acid copolymer) | 2.8 wt. % |
| Glycerin | 12.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

Those inks were printed on a medium having a coating layer, and L* value, a* value, and b* value in accordance with the CIE were measured. C* was then found by the following formula by using those values. C* value was found from $C^* = (a^{*2} + b^{*2})^{1/2}$, and h was found from $h = \tan^{-1}(b^*/a^*)$.

More specifically, each magenta ink was loaded into an ink-jet printer PM900C (manufactured by Seiko-Epson Co., Ltd.) and printing was conducted on the aforementioned PGPP (manufactured by Seiko-Epson Co., Ltd.) as an example of medium having a coating layer and printed products were obtained. In the printing, each magenta ink was ejected by changing Duty from 15% to 255% (ink weight 10-11 mg/inch2).

The L* value, a* value, b* value, C* value, and h value in accordance with the CIE were obtained by measuring at a view filed 20 with D50 light source by using device Macbeth SPM50 manufactured by Gretag Co.

The measurement results are shown in Tables 15 to 21.

TABLE 15

Working Example 1 <PV32 + PV19 (1:1) = total 4 wt. %>

| Duty | L* | a* | b* | C* | h |
| --- | --- | --- | --- | --- | --- |
| 255 | 33.41 | 72.57 | 12.91 | 73.71 | 10.09 |
| 130 | 34.23 | 73.99 | 8.52 | 74.48 | 6.57 |
| 205 | 35.45 | 75.87 | 2.10 | 75.90 | 1.59 |
| 180 | 37.00 | 77.75 | −5.42 | 77.94 | −3.99 |
| 155 | 39.59 | 78.41 | −13.52 | 79.57 | −9.78 |
| 130 | 44.21 | 74.72 | −20.06 | 77.37 | −15.03 |
| 105 | 51.51 | 64.76 | −22.82 | 68.66 | −19.41 |
| 80 | 60.64 | 51.34 | −21.80 | 55.78 | −23.01 |
| 55 | 72.04 | 32.97 | −17.16 | 37.17 | −27.50 |
| 30 | 82.34 | 16.94 | −11.63 | 20.55 | −34.47 |
| 15 | 88.32 | 8.03 | −8.14 | 11.43 | −45.39 |

TABLE 16

Working Example 2 <PV32 + PV19 (1:1) = total 2 wt. %>

| Duty | L* | a* | b* | C* | h |
|---|---|---|---|---|---|
| 255 | 37.32 | 78.13 | −7.33 | 78.47 | −5.36 |
| 130 | 38.79 | 78.69 | −10.93 | 79.45 | −7.91 |
| 205 | 40.48 | 79.77 | −15.34 | 81.23 | −10.89 |
| 180 | 42.57 | 78.10 | −21.00 | 80.87 | −15.05 |
| 155 | 46.61 | 74.85 | −24.33 | 78.70 | −18.01 |
| 130 | 52.84 | 67.37 | −26.32 | 72.33 | −21.34 |
| 105 | 59.82 | 54.22 | −25.33 | 59.84 | −25.04 |
| 80 | 67.28 | 40.71 | −21.57 | 46.07 | −27.92 |
| 55 | 75.83 | 27.48 | −16.36 | 31.98 | −30.77 |
| 30 | 83.86 | 15.22 | −11.40 | 19.02 | −36.83 |
| 15 | 88.63 | 7.85 | −8.33 | 11.45 | −46.70 |

TABLE 17

Working Example 3 <PV32 + PV19 (2:1) = total 4 wt. %>

| Duty | L* | a* | b* | C* | h |
|---|---|---|---|---|---|
| 255 | 32.35 | 73.15 | 22.28 | 76.47 | 16.94 |
| 130 | 33.10 | 74.34 | 16.23 | 76.09 | 12.32 |
| 205 | 34.12 | 75.96 | 10.28 | 76.65 | 7.71 |
| 180 | 35.73 | 77.67 | 1.66 | 77.69 | 1.22 |
| 155 | 38.37 | 78.19 | −7.85 | 78.58 | −5.73 |
| 130 | 43.23 | 74.37 | −15.62 | 75.99 | −11.86 |
| 105 | 50.60 | 64.84 | −19.45 | 67.70 | −16.70 |
| 80 | 60.04 | 51.11 | −19.50 | 54.70 | −20.88 |
| 55 | 71.76 | 33.12 | −15.75 | 36.67 | −25.43 |
| 30 | 82.71 | 17.06 | −10.60 | 20.09 | −31.85 |
| 15 | 88.91 | 8.13 | −7.32 | 10.94 | −42.00 |

TABLE 18

Working Example 4 <PV32 + PV19 (1:2) = total 4 wt. %>

| Duty | L* | a* | b* | C* | h |
|---|---|---|---|---|---|
| 255 | 35.41 | 76.55 | 13.08 | 77.66 | 9.70 |
| 130 | 36.32 | 77.49 | 7.49 | 77.85 | 5.52 |
| 205 | 37.69 | 78.70 | 1.01 | 78.71 | 0.74 |
| 180 | 39.79 | 79.75 | −6.14 | 79.99 | −4.40 |
| 155 | 43.39 | 78.05 | −13.23 | 79.16 | −9.62 |
| 130 | 49.02 | 71.37 | −18.05 | 73.61 | −14.19 |
| 105 | 56.79 | 59.90 | −19.54 | 63.00 | −18.07 |
| 80 | 66.09 | 44.78 | −17.77 | 48.18 | −21.64 |
| 55 | 76.47 | 28.31 | −13.82 | 31.50 | −26.02 |
| 30 | 85.02 | 14.68 | −9.54 | 17.51 | −33.02 |
| 15 | 90.05 | 7.03 | −6.74 | 9.74 | −43.79 |

TABLE 19

Comparative Example 1 <PR202: 4 wt. %>

| Duty | L* | a* | b* | C* | h |
|---|---|---|---|---|---|
| 255 | 36.25 | 78.56 | 5.95 | 78.78 | 4.33 |
| 230 | 36.95 | 79.32 | 1.98 | 79.34 | 1.43 |
| 205 | 38.19 | 80.18 | −4.10 | 80.28 | −2.93 |
| 180 | 40.19 | 80.82 | −11.67 | 81.66 | −8.22 |
| 155 | 43.04 | 78.31 | −16.61 | 81.46 | −13.21 |
| 130 | 47.18 | 74.34 | −24.43 | 78.25 | −18.19 |
| 105 | 52.72 | 65.11 | −26.90 | 70.45 | −22.45 |
| 80 | 59.90 | 52.12 | −26.08 | 58.28 | −26.58 |
| 55 | 69.57 | 35.63 | −21.90 | 41.82 | −31.58 |
| 30 | 80.27 | 19.00 | −15.24 | 24.36 | −38.73 |
| 15 | 87.30 | 9.41 | −9.63 | 13.46 | −45.66 |

TABLE 20

Comparative Example 2 <PV19: 4 wt. %>

| Duty | L* | a* | b* | C* | h |
|---|---|---|---|---|---|
| 255 | 44.15 | 79.38 | 26.25 | 83.6 | 18.3 |
| 230 | 44.78 | 79.83 | 22.6 | 83.0 | 15.8 |
| 205 | 45.84 | 80.51 | 16.54 | 82.2 | 11.6 |
| 180 | 47.23 | 80.88 | 8.75 | 81.4 | 6.2 |
| 155 | 49.28 | 81.07 | 0.71 | 81.1 | 0.5 |
| 130 | 52.35 | 78.7 | −7.1 | 79.0 | −5.2 |
| 105 | 56.72 | 72.49 | −12.48 | 73.6 | −9.8 |
| 80 | 62.55 | 62.04 | −14.79 | 63.8 | −13.4 |
| 55 | 71.1 | 45.32 | −13.92 | 47.4 | −17.1 |
| 30 | 81.07 | 25.64 | −10.81 | 27.8 | −22.9 |
| 15 | 87.56 | 12.94 | −7.36 | 14.9 | −29.6 |

TABLE 21

Comparative Example 3 <PV32: 4 wt. %>

| Duty | L* | a* | b* | C* | h |
|---|---|---|---|---|---|
| 255 | 30.09 | 69.36 | 31.76 | 76.3 | 24.6 |
| 230 | 30.67 | 70.28 | 28.43 | 75.8 | 22.0 |
| 205 | 31.6 | 71.9 | 22.37 | 75.3 | 17.3 |
| 180 | 32.87 | 74.09 | 13.96 | 75.4 | 10.7 |
| 155 | 34.68 | 76.37 | 3.61 | 76.5 | 2.7 |
| 130 | 37.83 | 76.95 | −7.57 | 77.3 | −5.6 |
| 105 | 43.81 | 71.43 | −15.74 | 73.1 | −12.4 |
| 80 | 52.33 | 59.99 | −19.09 | 63.0 | −17.7 |
| 55 | 63.64 | 43.14 | −17.33 | 46.5 | −21.9 |
| 30 | 76.97 | 23.85 | −12.02 | 26.7 | −26.7 |
| 15 | 85.74 | 11.9 | −7.75 | 14.2 | −33.1 |

Figure 5:
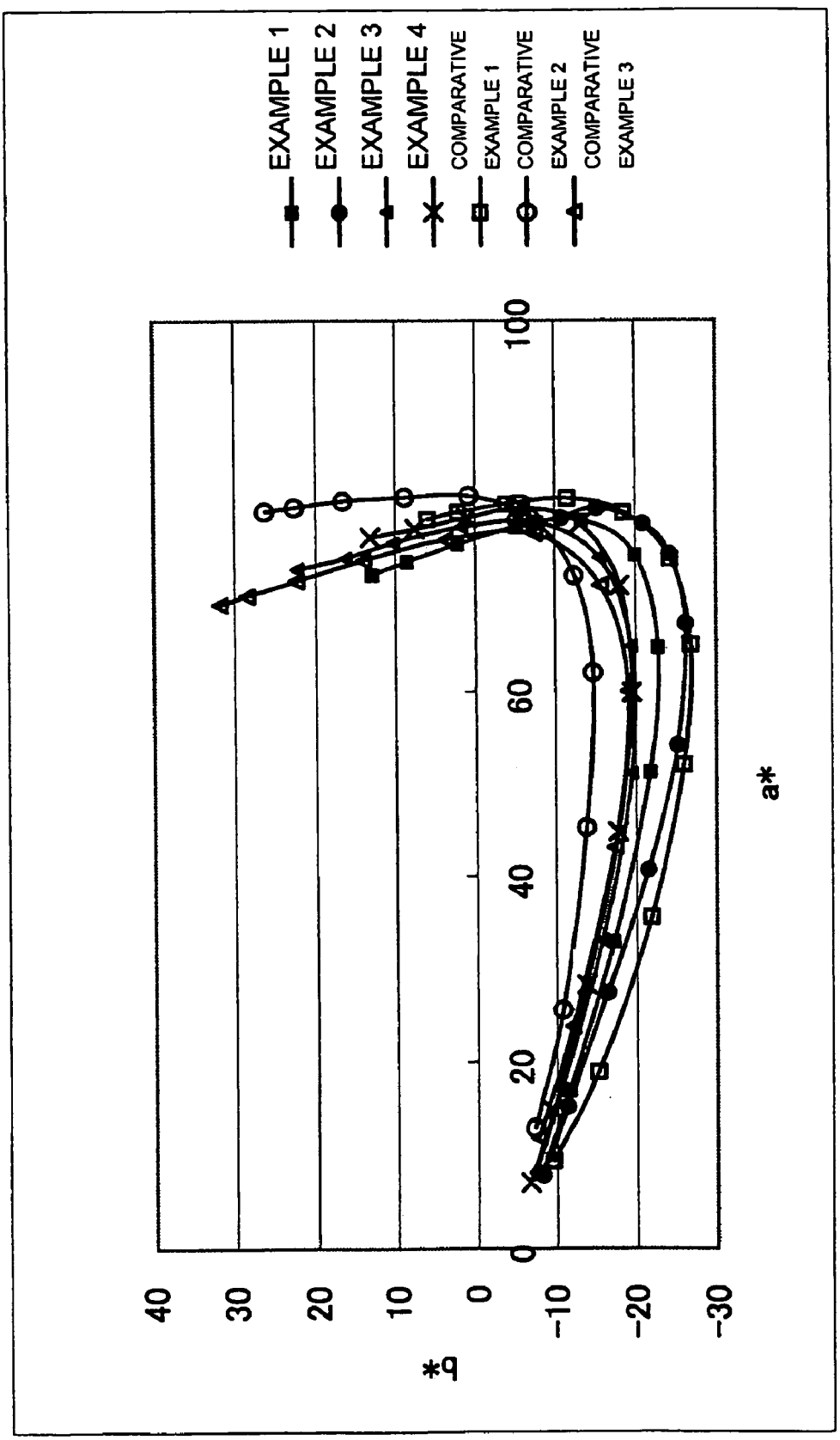
FIG. 5 is a graph illustrating the relationship between L* values and a* values of magenta inks with pigments of different types.

FIG. 5 shows a graph in which the a* values of tables 15 to 21 are plotted against the abscissa and b* values are plotted against the ordinate.

Figure 6:
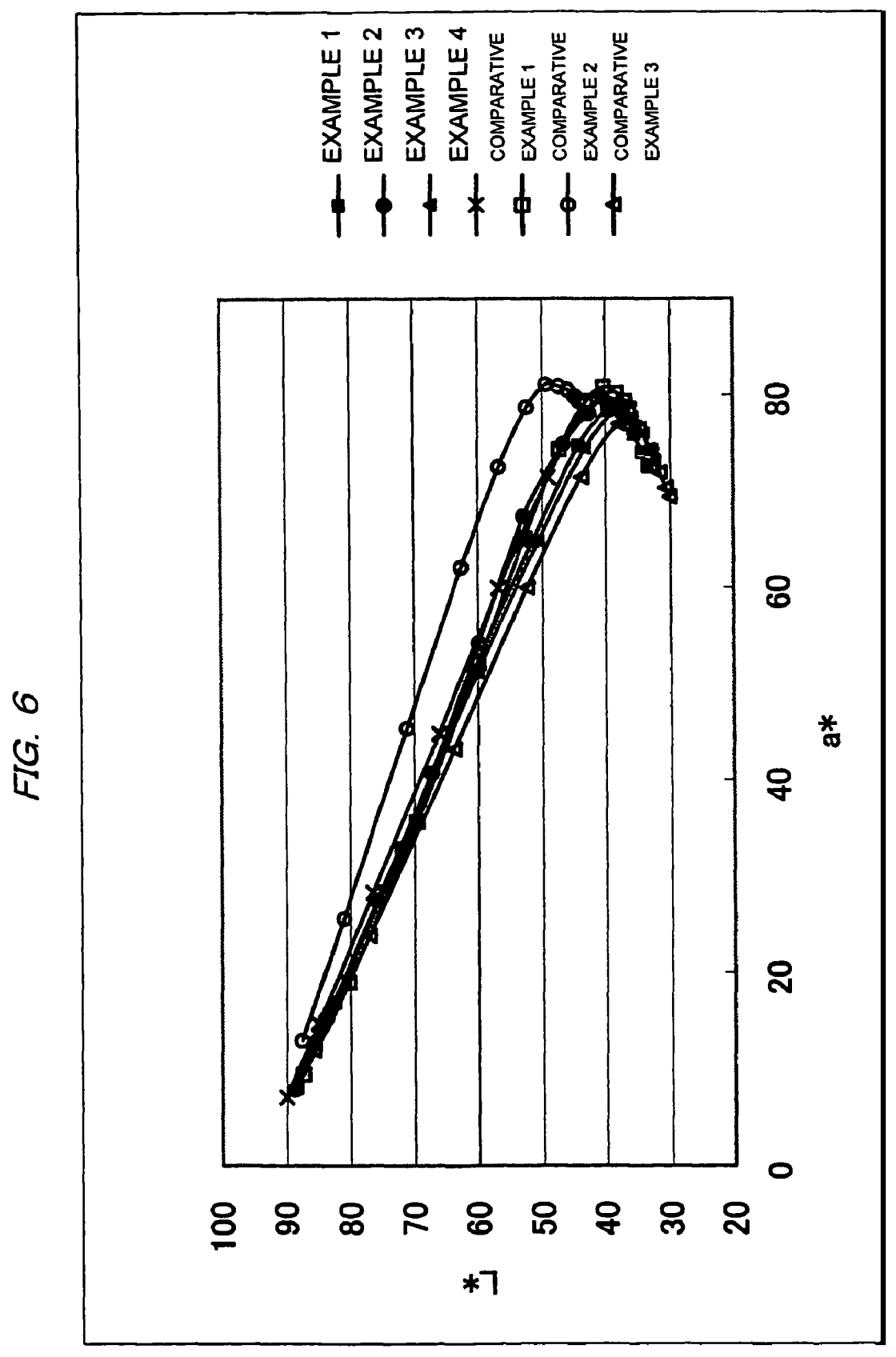

FIG. 6 shows a graph in which the a* values of tables 15 to 21 are plotted against the abscissa and L* values are plotted against the ordinate. Of the graph shown in FIG. 6, the section with the a* value of 0 to 40 are shown in greater detail in FIG. 7 and the section with the a* values of 60 to 85 is shown in greater detail in FIG. 8.

FIG. 5 suggests that the ink compositions of Working Examples 1 to 4 and Comparative Examples 1 to 3 have almost identical color reproducibility. On the other hand, considering that the content of pigment solids in the ink composition of Comparative Example 2 is lower than that of other ink compositions, the ink composition in accordance with the invention clearly has excellent color reproducibility.

Figure 7:
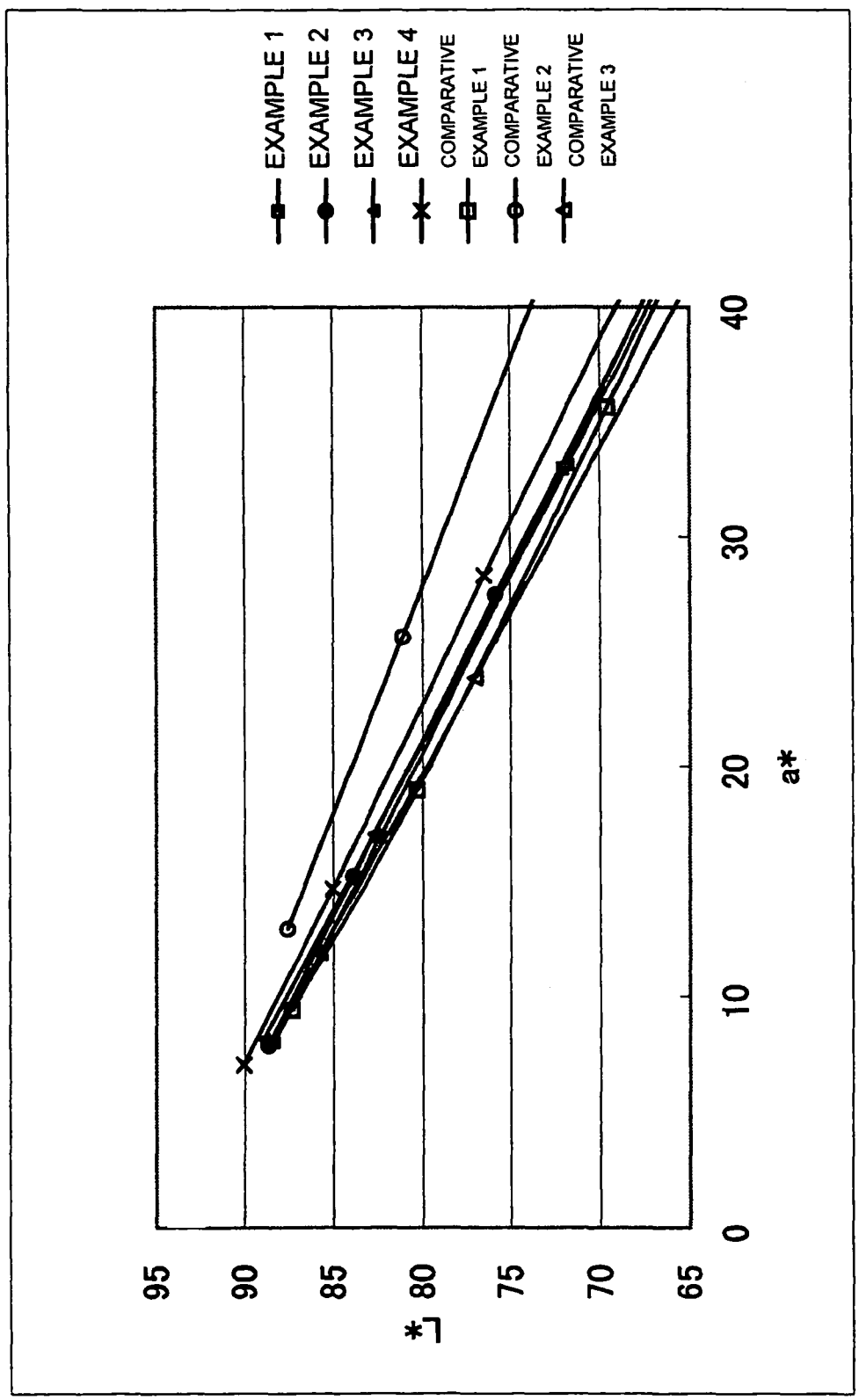
FIG. 7 is an enlarged via of part of the graph shown in FIG. 6 (low-chroma region)
Figure 8:
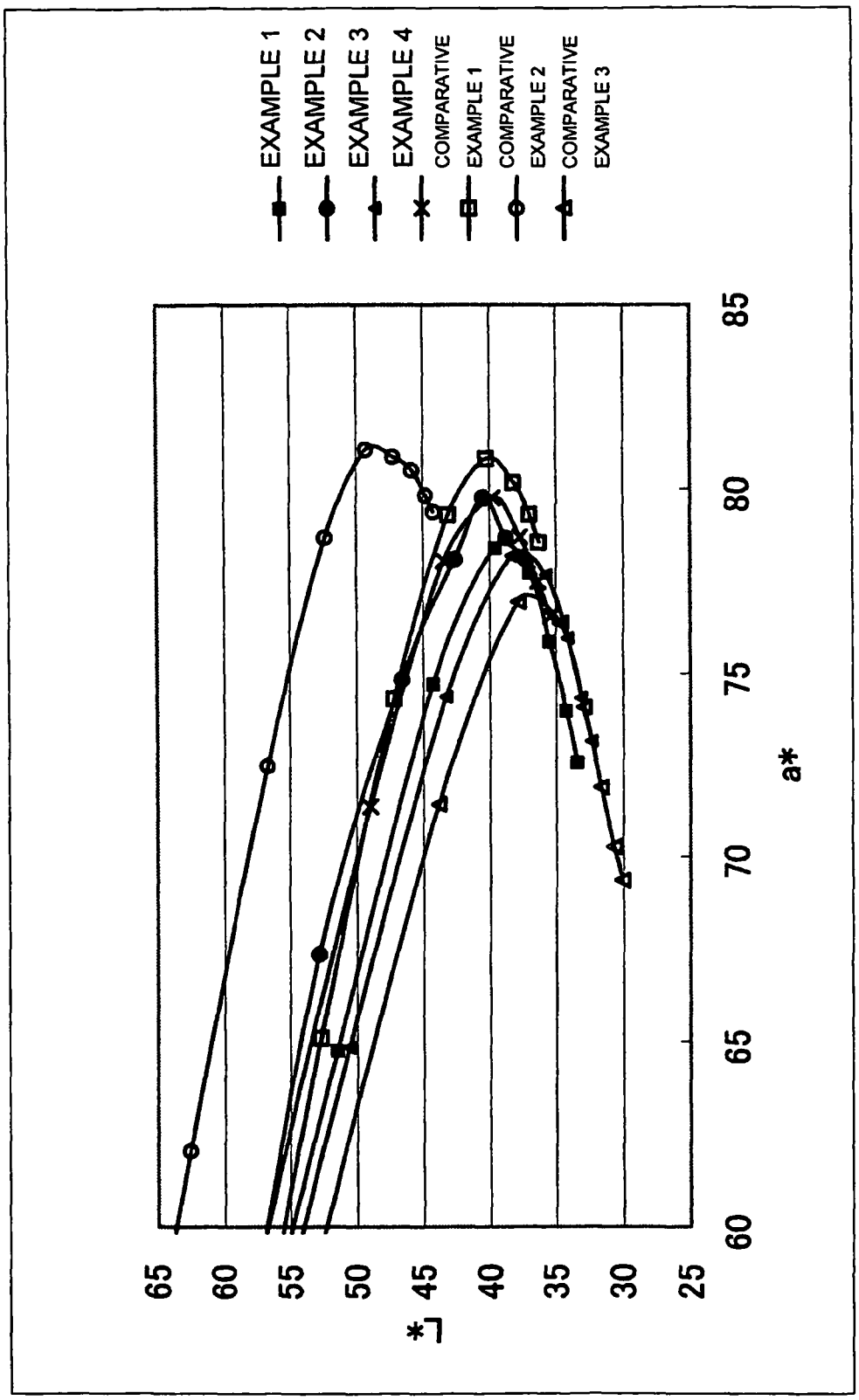
FIG. 8 is an enlarged via of part of the graph shown in FIG. 6 (high-chroma region)
Figure 9:
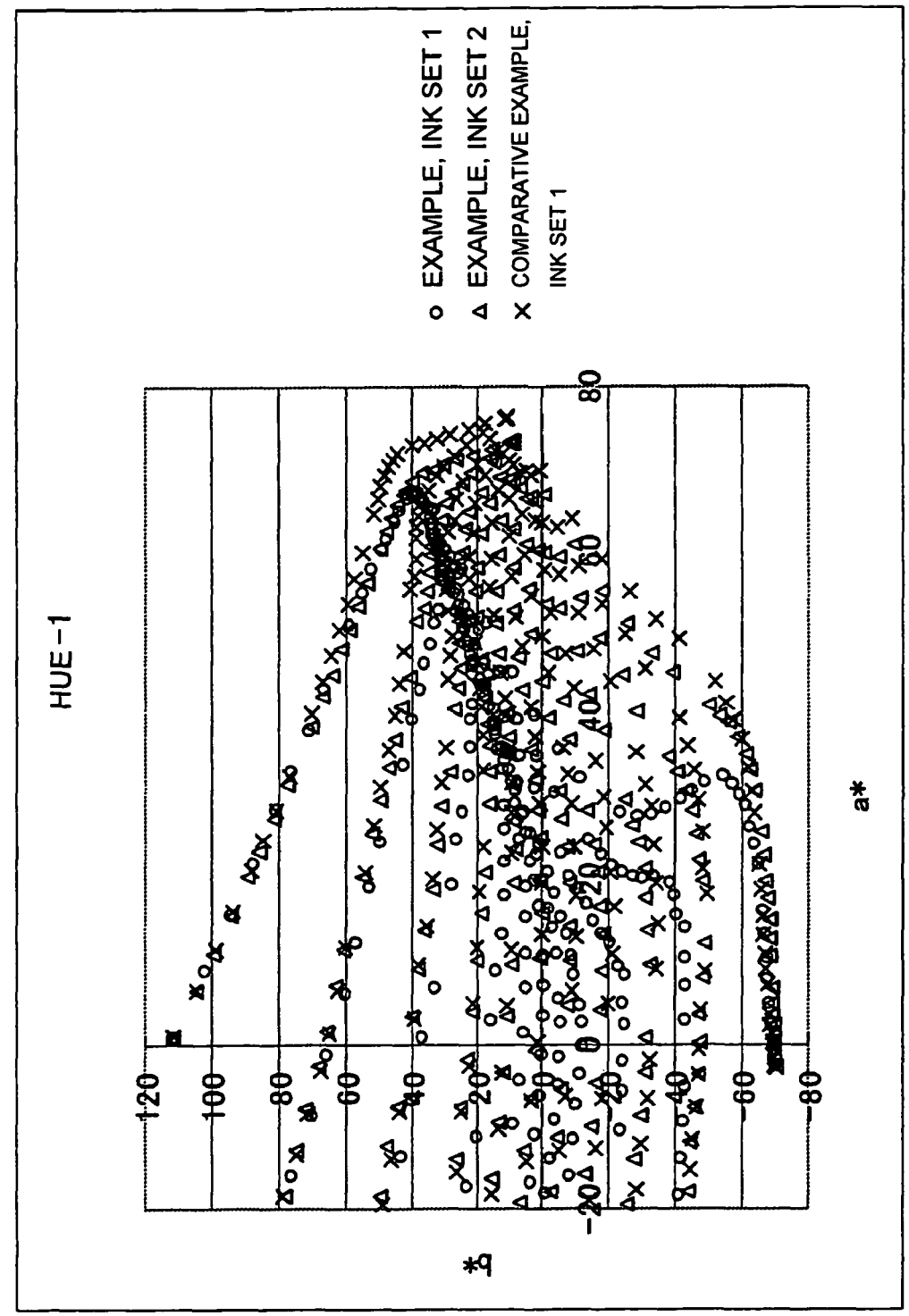
FIG. 9 shows reproducibility of ink sets of working examples and comparative examples.
Figure 10:
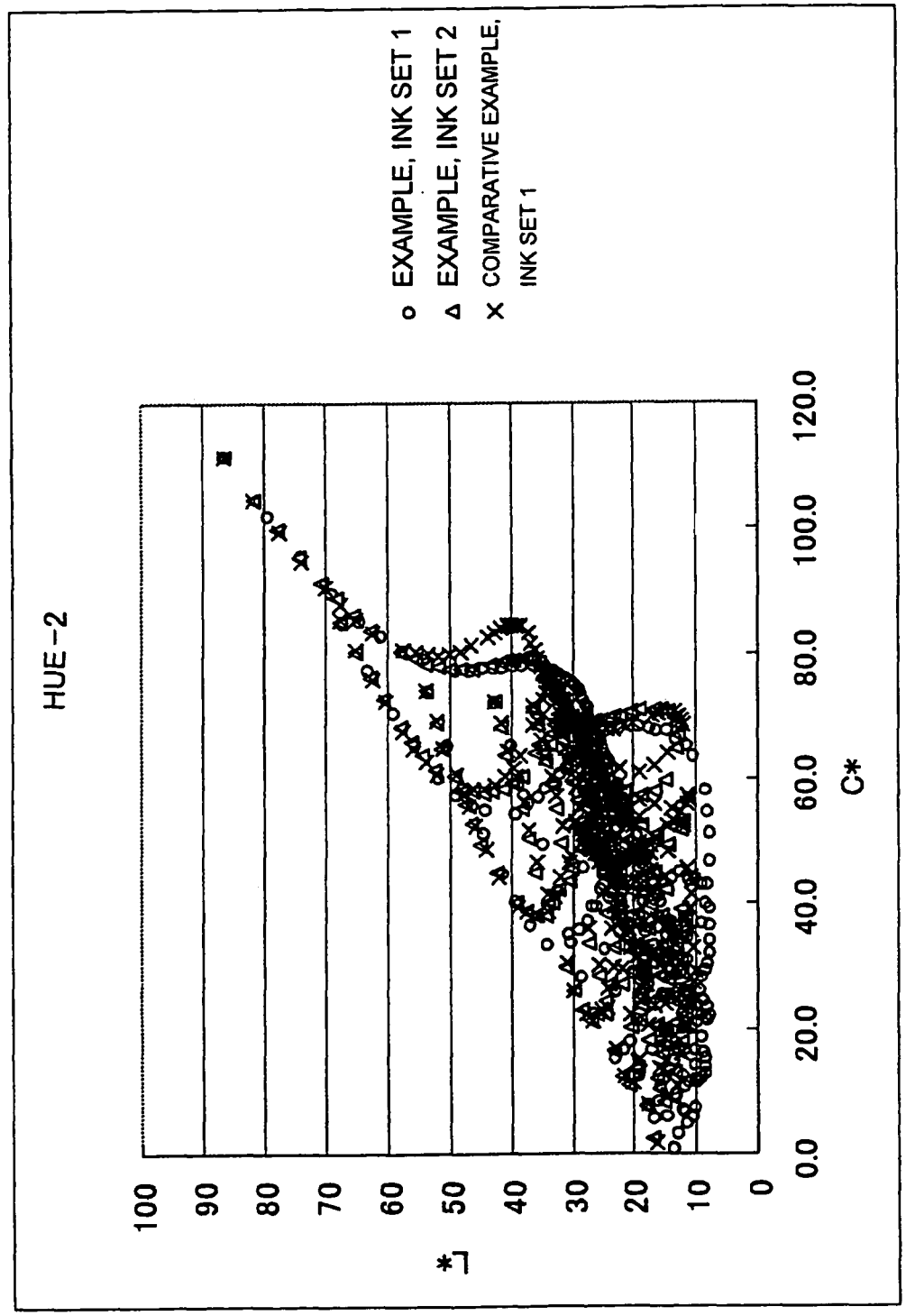
FIG. 10 shows reproducibility of ink sets of working examples and comparative examples.
Figure 11:
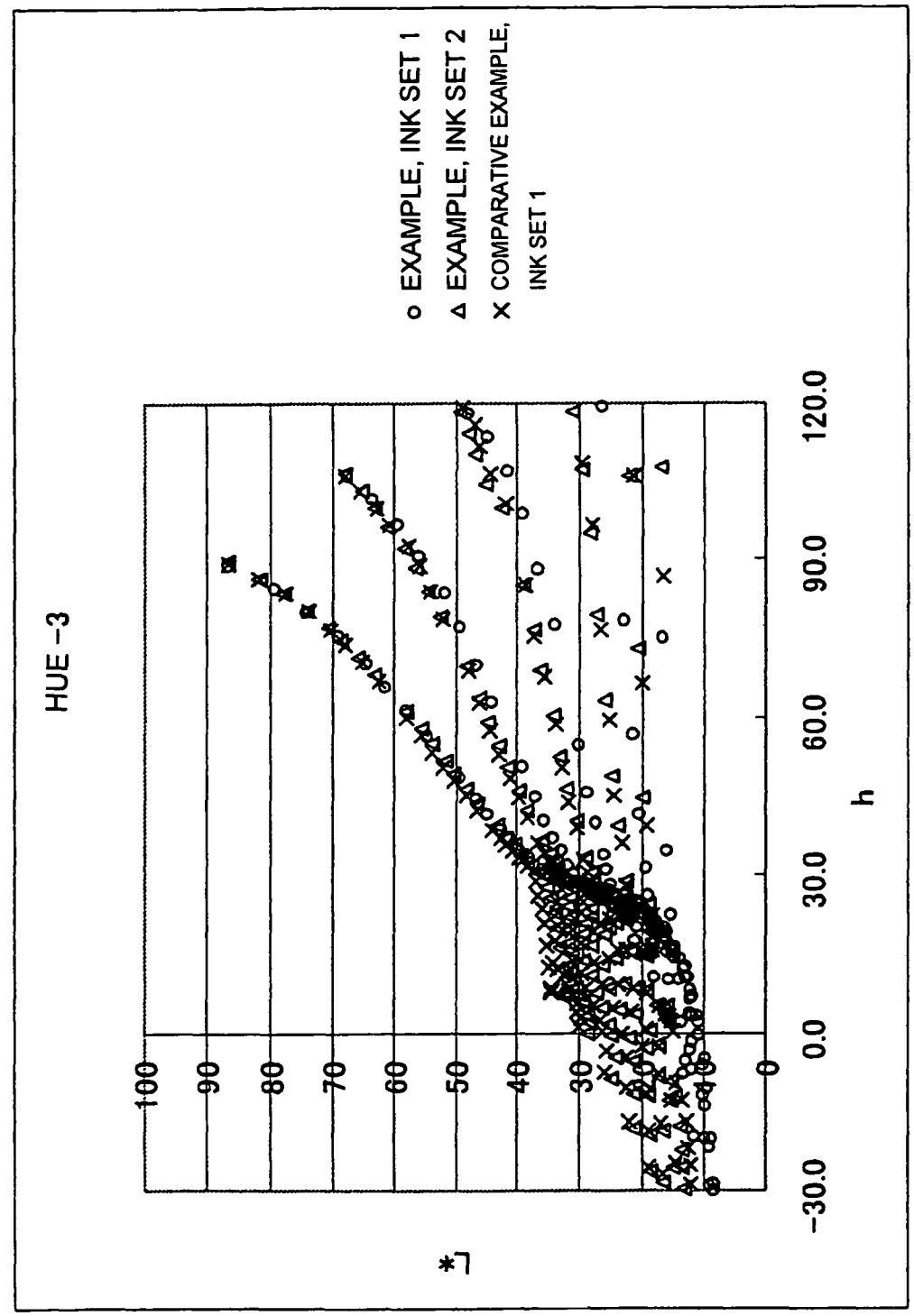
FIG. 11 shows reproducibility of ink sets of working examples and comparative examples.
Figure 12:
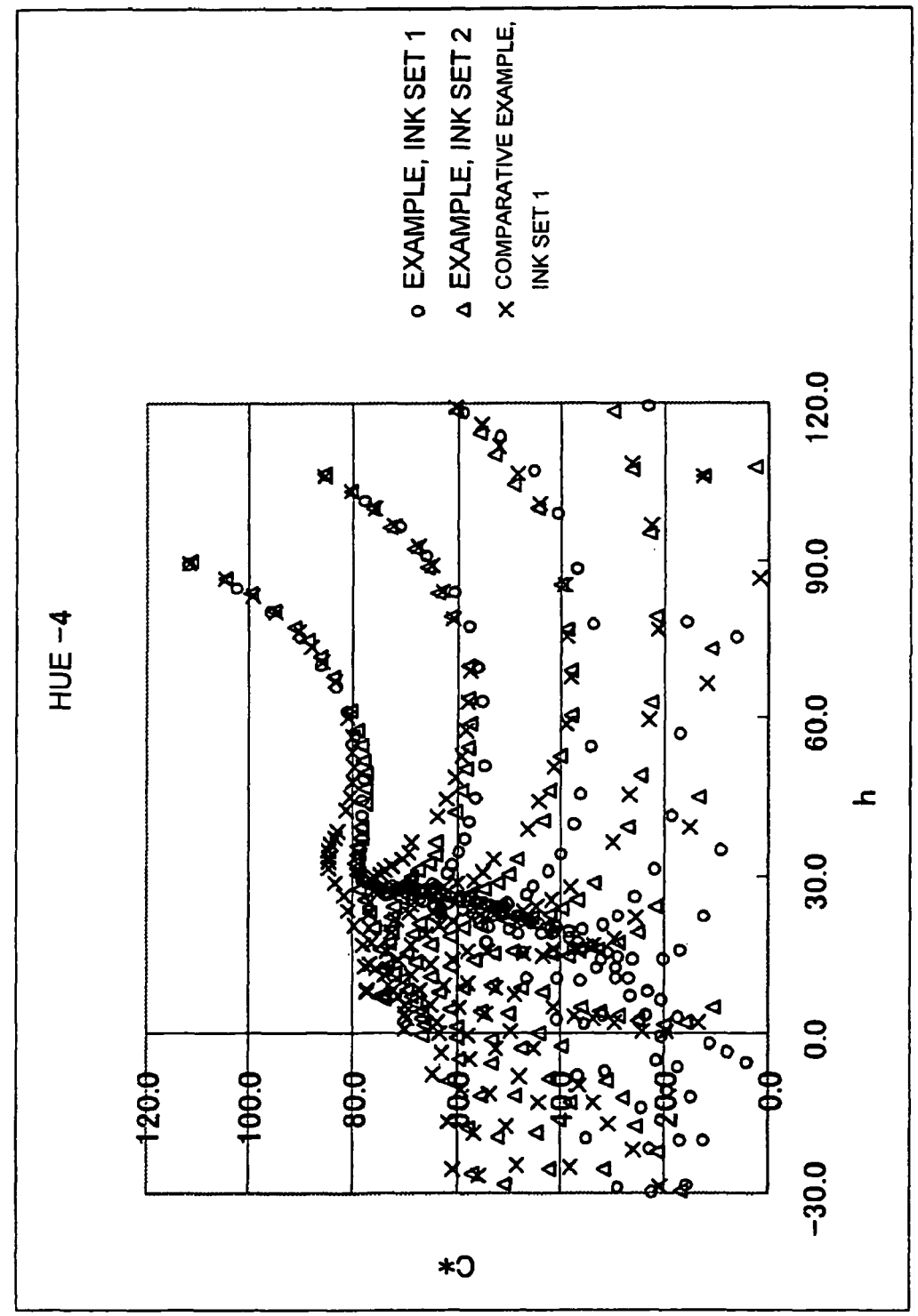
FIG. 12 shows reproducibility of ink sets of working examples and comparative examples.

FIG. 7 demonstrates that the ink composition of Comparative Example 2 has an L* value in a low-a* region higher than that of the ink compositions of Working Examples 1 to 4 and excels in granularity. However, as shown in FIG. 8, it has poor coloring ability of a dark section in the high-a* region. On the other hand, the ink compositions of Comparative Example 1 and Comparative Example 3, conversely to the ink composition of Comparative Example 2, have coloring ability of a dark section in the high-a* region on par with that of the ink compositions of Working Examples 1 to 4, but the L* value thereof in a low-a* region is low and granularity is poor. The ink compositions of Working Examples 1 to 4 have excellent balance of granularity and coloring ability of a dark section. Thus, it is clear that they have excellent color reproducibility in a high-chroma and low-lightness red region and also excel in granularity.

Measurement of L*, a*, b* Values of Diluted Aqueous Solution of Magenta Ink

Magenta inks of working examples and comparative examples were prepared so that the pigment concentration of any one type of mixtures of PV32 and PV19 (mixing ratios 1:1, 2:1, 1:20), PV32, PV19 and PR202 was 4 wt. %, and then the inks were diluted with water to obtain an a* value of 80. The aqueous solution comprising a 1:1 mixture of PV32 and PV19 had to be diluted at a ratio of about 1000, the aqueous solution comprising a 2:1 mixture of PV32 and PV19 had to be diluted at a ratio of about 1160, an aqueous solution comprising a 1:2 mixture of PV32 and PV19 had to be diluted at a ratio of about 910, the aqueous solution comprising PR202 had to be diluted at a ratio of about 660, the aqueous solution comprising PV19 had to be diluted at a ratio of about 500, and the aqueous solution comprising PV32 had to be diluted at a ratio of about 1500.

Measurements of L* value, a* value, and b* value of each aqueous solution were conducted by using U3300 manufactured by Hitachi Ltd. More specifically, transmittance measurements were carried out at a scan speed of 600 nm/min, a measurement wavelength range of 380-800 nm, and a slit width of 2.0 nm and calculations were conducted for a view angle of 2° and a D65 light source.

The results are shown in Table 22 below. The type, mixing ratio and concentration of the pigment are shown in the column at the left side of Table 22. From top to bottom, the data correspond to ink compositions of a Working Example 1, Working Example 3, Working Example 4, Comparative Example 1, Comparative Example 2, and Comparative Example 3. Because the coloring component contained in the ink compositions is only the pigment, it is obvious to a person skilled in the art, that if the ink composition of Working Example 2 is diluted at a ratio of about 500, the L* value and b* value will be similar to the (PV 19+PV32=1:1)_4%.

TABLE 22

|  | a*80 | | |
| --- | --- | --- | --- |
|  | L* | b* | Dilution ratio |
| (PV19 + PV32 = 1:1)_4% | 51.07 | −34.09 | About 1000 |
| (PV19:PV32 = 1:2)_4% | 51.87 | −35.26 | About 1160 |
| (PV19:PV32 = 2:1)_4% | 54.64 | −30.26 | About 910 |
| PR202_4% | 50.92 | −28.63 | About 660 |
| PV19_4% | 61.04 | −16.72 | About 500 |
| PV32_4% | 49.51 | −38.60 | About 1500 |

For the ink compositions of Working Examples 1 to 4, it can be confirmed that when the a* value was 80, the b* value was −38 or more to −29 or less and the L* value was 60 or less.

Then, aqueous solutions comprising 2% of pigment of one type were prepared for magenta ink compositions of each working example and comparative example and diluted at a ratio of 10,000 to obtain aqueous solutions with a pigment concentration of $2\times10^{-3}$ g/L. L*, a*, and b* values were then measured by the above-described methods. The results are shown in Table 23.

TABLE 13

|  | 10,000 | | |
| --- | --- | --- | --- |
| Dilution ratio | L* | a* | b* |
| (PV19 + PV32)_2% | 65.19 | 7.45 | −3.85 |
| (PV19:PV32 = 1:2)_2% | 94.60 | 9.07 | −5.23 |
| (PV19:PV32 = 2:1)_2% | 96.33 | 6.76 | −3.38 |

TABLE 13-continued

|  | 10,000 | | |
| --- | --- | --- | --- |
| Dilution ratio | L* | a* | b* |
| PR202_2% | 97.15 | 3.41 | −2.81 |
| PV19_2% | 97.50 | 5.28 | −1.86 |
| PV32_2% | 93.98 | 9.27 | −6.16 |

In the ink compositions of Working Examples 1 to 4, the a* value was confirmed to be 5 or more in n aqueous solution with a pigment concentration of $2\times10^{-3}$ g/L.

The above-described results confirmed that the magenta ink composition in which when the a* value in accordance with the CIE standard that is calculated from a visible absorption spectrum is 80 in a diluted aqueous solution with a dilution ratio of 10,000 or less, the b* value is −38 or more to −29 or less (preferably, the L* value in accordance with the CIE standard that is calculated under the same conditions is 60 or less, and the magenta ink in which the a* value in accordance with the CIE standard that is calculated from a visible absorption spectrum is 5 or more in a diluted aqueous solution with a pigment concentration of $2\times10^{-3}$ g/L have-excellent color reproducibility in a high-chroma and low-lightness region, are rich in luster, and hardly cause any clogging of ink-jet recording heads.

Working Example C

Preparation of Ink Set

Magenta inks (M1), (M2), (m1), yellow ink (Y1), and cyan ink (C1) of the below-described compositions contained in each ink set of the working examples and comparative examples were prepared by the usual methods. Thus, the inks were prepared by dispersing the coloring agent component together with the dispersing agent component, then adding and mixing other components, and filtering out insolubles with a size above a fixed level. The inks obtained were combined to obtain ink sets of working examples and comparative examples.

The magenta inks (M1) and (M2) comprised C. I. Pigment Violet 32 as the coloring material, whereas (m1) contained no C. I. Pigment Violet 32 and comprised C. I. Pigment Red 202.

| Magenta Ink (M1) | |
| --- | --- |
| C.I. Pigment Violet 32 | 4.0 wt. % |
| Dispersant (styrene-acrylic acid copolymer) | 2.0 wt. % |
| Glycerin | 14.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

| Magenta Ink (M2) | |
| --- | --- |
| C.I. Pigment Violet 32 | 2.0 wt. % |
| Dispersant (styrene-acrylic acid copolymer) | 1.0 wt. % |
| Glycerin | 20.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

-continued

| Magenta Ink (m1) | |
| --- | --- |
| C.I. Pigment Red 202 | 5.5 wt. % |
| Dispersant (styrene-acrylic acid copolymer) | 2.8 wt. % |
| Glycerin | 10.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

| Yellow Ink (Y1) | |
| --- | --- |
| C.I. Pigment Yellow 74 | 5.5 wt. % |
| Dispersant (styrene-acrylic acid copolymer) | 2.8 wt. % |
| Glycerin | 12.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

| Cyan Ink (C1) | |
| --- | --- |
| C.I. Pigment Blue 15:3 | 4.0 wt. % |
| Dispersant (styrene-acrylic acid copolymer) | 2.0 wt. % |
| Glycerin | 14.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

The results obtained in measuring the reverse-flow viscosity are 5 shown in Table 24.

TABLE 24

| | M1 | M2 | M1 | Y1 | C1 |
| --- | --- | --- | --- | --- | --- |
| Reverse-flow viscosity | 3.6 | 3.6 | 3.6 | 3.6 | 3.6 |

The above-described inks were combined as shown in Table 25 to obtain ink sets 1 and 2 as working examples and ink set 3 as a comparative example.

TABLE 25

| | Magenta ink | Yellow ink | Cyan ink |
| --- | --- | --- | --- |
| Ink set 1 (working example) | M1 | Y1 | C1 |
| Ink set 2 (working example) | M2 | Y1 | C1 |
| Ink set 3 (comparative example) | m1 | Y1 | C1 |

Evaluation of Color Reproducibility

With respect to the ink sets 1-3, the ink-jet printer PX-G900 (manufactured by Seiko-Epson Co., Ltd.) produced an output in a high-accuracy chroma mode of photographic paper "Luster" for photographic paper "Luster", and color measurements of the printed product thus obtained were conducted with a D50 light source at a view angle of 2° by using a Macbeth-Spectroscan manufactured by Gretag Co. The ejection patterns of each of M1, M2, m1, Y1, and C1 inks are shown in Tables 26-30. In the case of ink set 1, the inks were ejected following the patterns shown in Table 26, Table 29, and Table 30.

TABLE 26

Magenta Ink Composition (M1) (Working Example)

| | | | | | | | | | | |
| --- | --- | --- | --- | --- | --- | --- | --- | --- | --- | --- |
| 0 | 0 | 0 | 0 | 0 | 0 | 0 | 0 | 0 | 0 | 0 |
| 8 | 8 | 9 | 9 | 9 | 9 | 9 | 9 | 9 | 8 | 8 |
| 15 | 16 | 17 | 18 | 18 | 18 | 18 | 18 | 17 | 16 | 15 |
| 23 | 24 | 26 | 28 | 28 | 28 | 28 | 28 | 26 | 24 | 23 |
| 31 | 33 | 35 | 37 | 37 | 37 | 37 | 37 | 35 | 33 | 31 |
| 38 | 41 | 43 | 46 | 46 | 46 | 46 | 46 | 43 | 41 | 38 |
| 46 | 49 | 52 | 55 | 55 | 55 | 55 | 55 | 52 | 49 | 46 |
| 54 | 57 | 61 | 64 | 64 | 64 | 64 | 64 | 61 | 57 | 54 |
| 69 | 73 | 78 | 83 | 83 | 83 | 83 | 83 | 78 | 73 | 69 |
| 77 | 82 | 87 | 92 | 92 | 92 | 92 | 92 | 87 | 82 | 77 |
| 84 | 90 | 95 | 101 | 101 | 101 | 101 | 101 | 95 | 90 | 84 |
| 92 | 98 | 104 | 110 | 110 | 110 | 110 | 110 | 104 | 98 | 92 |
| 99 | 106 | 113 | 119 | 119 | 119 | 119 | 119 | 113 | 106 | 99 |
| 107 | 114 | 121 | 129 | 129 | 129 | 129 | 129 | 121 | 114 | 107 |
| 115 | 122 | 130 | 138 | 138 | 138 | 138 | 138 | 130 | 122 | 115 |
| 130 | 139 | 147 | 156 | 156 | 156 | 156 | 156 | 147 | 139 | 130 |
| 138 | 148 | 156 | 165 | 165 | 165 | 165 | 165 | 156 | 147 | 138 |
| 145 | 155 | 165 | 174 | 174 | 174 | 174 | 174 | 165 | 155 | 145 |
| 153 | 163 | 173 | 184 | 184 | 184 | 184 | 184 | 173 | 163 | 153 |
| 161 | 171 | 182 | 193 | 193 | 193 | 193 | 193 | 182 | 171 | 161 |
| 168 | 179 | 191 | 202 | 202 | 202 | 202 | 202 | 191 | 179 | 168 |
| 176 | 188 | 199 | 211 | 211 | 211 | 211 | 211 | 199 | 188 | 176 |
| 194 | 207 | 219 | 233 | 233 | 233 | 233 | 233 | 219 | 207 | 194 |
| 204 | 217 | 231 | 245 | 245 | 245 | 245 | 245 | 231 | 217 | 204 |
| 214 | 228 | 242 | 257 | 257 | 257 | 257 | 257 | 242 | 228 | 214 |
| 224 | 239 | 254 | 269 | 269 | 269 | 269 | 269 | 254 | 239 | 224 |
| 235 | 250 | 266 | 282 | 282 | 282 | 282 | 282 | 266 | 250 | 235 |
| 245 | 261 | 277 | 294 | 294 | 294 | 294 | 294 | 277 | 261 | 245 |
| 255 | 272 | 289 | 306 | 306 | 306 | 306 | 306 | 289 | 272 | 255 |

TABLE 27

Magenta Ink Composition (M2) (Working Example)

| | | | | | | | | | | |
|---|---|---|---|---|---|---|---|---|---|---|
| 0 | 0 | 0 | 0 | 0 | 0 | 0 | 0 | 0 | 0 | 0 |
| 8 | 8 | 9 | 9 | 9 | 9 | 9 | 9 | 9 | 8 | 8 |
| 15 | 16 | 17 | 18 | 18 | 18 | 18 | 18 | 17 | 16 | 15 |
| 23 | 24 | 26 | 28 | 28 | 28 | 28 | 28 | 26 | 24 | 23 |
| 31 | 33 | 35 | 37 | 37 | 37 | 37 | 37 | 35 | 33 | 31 |
| 38 | 41 | 43 | 46 | 46 | 46 | 46 | 46 | 43 | 41 | 38 |
| 46 | 49 | 52 | 55 | 55 | 55 | 55 | 55 | 52 | 49 | 46 |
| 54 | 57 | 61 | 64 | 64 | 64 | 64 | 64 | 61 | 57 | 54 |
| 69 | 73 | 78 | 83 | 83 | 83 | 83 | 83 | 78 | 73 | 69 |
| 77 | 82 | 87 | 92 | 92 | 92 | 92 | 92 | 87 | 82 | 77 |
| 84 | 90 | 95 | 101 | 101 | 101 | 101 | 101 | 95 | 90 | 84 |
| 92 | 98 | 104 | 110 | 110 | 110 | 110 | 110 | 104 | 98 | 92 |
| 99 | 106 | 113 | 119 | 119 | 119 | 119 | 119 | 113 | 106 | 99 |
| 107 | 114 | 121 | 129 | 129 | 129 | 129 | 129 | 121 | 114 | 107 |
| 115 | 122 | 130 | 138 | 138 | 138 | 138 | 138 | 130 | 122 | 115 |
| 130 | 139 | 147 | 156 | 156 | 156 | 156 | 156 | 147 | 139 | 130 |
| 138 | 147 | 156 | 165 | 165 | 165 | 165 | 165 | 156 | 147 | 138 |
| 145 | 155 | 165 | 174 | 174 | 174 | 174 | 174 | 165 | 155 | 145 |
| 153 | 163 | 173 | 184 | 184 | 184 | 184 | 184 | 173 | 163 | 153 |
| 161 | 171 | 182 | 193 | 193 | 193 | 193 | 193 | 182 | 171 | 161 |
| 168 | 179 | 191 | 202 | 202 | 202 | 202 | 202 | 191 | 179 | 168 |
| 176 | 188 | 199 | 211 | 211 | 211 | 211 | 211 | 199 | 188 | 176 |
| 194 | 207 | 219 | 233 | 233 | 233 | 233 | 233 | 219 | 207 | 194 |
| 204 | 217 | 231 | 245 | 245 | 245 | 245 | 245 | 231 | 217 | 204 |
| 214 | 228 | 242 | 257 | 257 | 257 | 257 | 257 | 242 | 228 | 214 |
| 224 | 239 | 254 | 269 | 269 | 269 | 269 | 269 | 254 | 239 | 224 |
| 235 | 250 | 266 | 282 | 282 | 282 | 282 | 282 | 266 | 250 | 235 |
| 245 | 261 | 277 | 294 | 294 | 294 | 294 | 294 | 277 | 261 | 245 |
| 255 | 272 | 289 | 306 | 306 | 306 | 306 | 306 | 289 | 272 | 255 |

TABLE 28

Magenta Ink Composition (m1) (Comparative Example)

| | | | | | | | | | | |
|---|---|---|---|---|---|---|---|---|---|---|
| 0 | 0 | 0 | 0 | 0 | 0 | 0 | 0 | 0 | 0 | 0 |
| 8 | 8 | 9 | 9 | 9 | 9 | 9 | 9 | 9 | 8 | 8 |
| 15 | 16 | 17 | 18 | 18 | 18 | 18 | 18 | 17 | 16 | 15 |
| 23 | 24 | 26 | 28 | 28 | 28 | 28 | 28 | 26 | 24 | 23 |
| 31 | 33 | 35 | 37 | 37 | 37 | 37 | 37 | 35 | 33 | 31 |
| 38 | 41 | 43 | 46 | 46 | 46 | 46 | 46 | 43 | 41 | 38 |
| 46 | 49 | 52 | 55 | 55 | 55 | 55 | 55 | 52 | 49 | 46 |
| 54 | 57 | 61 | 64 | 64 | 64 | 64 | 64 | 61 | 57 | 54 |
| 69 | 73 | 78 | 83 | 83 | 83 | 83 | 83 | 78 | 73 | 69 |
| 77 | 82 | 87 | 92 | 92 | 92 | 92 | 92 | 87 | 82 | 77 |
| 84 | 90 | 95 | 101 | 101 | 101 | 101 | 101 | 95 | 90 | 84 |
| 92 | 98 | 104 | 110 | 110 | 110 | 110 | 110 | 104 | 98 | 92 |
| 99 | 106 | 113 | 119 | 119 | 119 | 119 | 119 | 113 | 106 | 99 |
| 107 | 114 | 121 | 129 | 129 | 129 | 129 | 129 | 121 | 114 | 107 |
| 115 | 122 | 130 | 138 | 138 | 138 | 138 | 138 | 130 | 122 | 115 |
| 130 | 139 | 147 | 156 | 156 | 156 | 156 | 156 | 147 | 139 | 130 |
| 138 | 147 | 156 | 165 | 165 | 165 | 165 | 165 | 156 | 147 | 138 |
| 145 | 155 | 165 | 174 | 174 | 174 | 174 | 174 | 165 | 155 | 145 |
| 153 | 163 | 173 | 184 | 184 | 184 | 184 | 184 | 173 | 163 | 153 |
| 161 | 171 | 182 | 193 | 193 | 193 | 193 | 193 | 182 | 171 | 161 |
| 168 | 179 | 191 | 202 | 202 | 202 | 202 | 202 | 191 | 179 | 168 |
| 176 | 188 | 199 | 211 | 211 | 211 | 211 | 211 | 199 | 188 | 176 |
| 194 | 207 | 219 | 233 | 233 | 233 | 233 | 233 | 219 | 207 | 194 |
| 204 | 217 | 231 | 245 | 245 | 245 | 245 | 245 | 231 | 217 | 204 |
| 214 | 228 | 242 | 257 | 257 | 257 | 257 | 257 | 242 | 228 | 214 |
| 224 | 239 | 254 | 269 | 269 | 269 | 269 | 269 | 254 | 239 | 224 |
| 235 | 250 | 266 | 282 | 282 | 282 | 282 | 282 | 266 | 250 | 235 |
| 245 | 261 | 277 | 294 | 294 | 294 | 294 | 294 | 277 | 261 | 245 |
| 255 | 272 | 289 | 306 | 306 | 306 | 306 | 306 | 289 | 272 | 255 |

TABLE 29

Yellow Ink Composition (Y1)

| 255 | 245 | 231 | 214 | 184 | 153 | 122 | 92 | 58 | 27 | 0 |
|---|---|---|---|---|---|---|---|---|---|---|
| 247 | 237 | 224 | 208 | 178 | 148 | 119 | 89 | 56 | 26 | 0 |
| 240 | 230 | 217 | 201 | 173 | 144 | 115 | 86 | 54 | 26 | 0 |
| 232 | 223 | 210 | 195 | 167 | 139 | 111 | 84 | 53 | 25 | 0 |
| 224 | 215 | 203 | 188 | 162 | 135 | 108 | 81 | 51 | 24 | 0 |
| 217 | 208 | 196 | 182 | 156 | 130 | 104 | 78 | 49 | 23 | 0 |
| 209 | 201 | 189 | 176 | 151 | 125 | 100 | 75 | 47 | 22 | 0 |
| 201 | 193 | 182 | 169 | 145 | 121 | 97 | 73 | 46 | 21 | 0 |
| 186 | 179 | 169 | 156 | 134 | 112 | 89 | 67 | 42 | 20 | 0 |
| 179 | 171 | 162 | 150 | 129 | 107 | 86 | 64 | 40 | 19 | 0 |
| 171 | 164 | 155 | 144 | 123 | 103 | 82 | 62 | 39 | 18 | 0 |
| 163 | 157 | 148 | 137 | 118 | 98 | 78 | 59 | 37 | 17 | 0 |
| 156 | 149 | 141 | 131 | 112 | 93 | 75 | 56 | 35 | 17 | 0 |
| 148 | 142 | 134 | 124 | 106 | 89 | 71 | 53 | 33 | 15 | 0 |
| 140 | 135 | 127 | 118 | 101 | 84 | 67 | 50 | 32 | 16 | 0 |
| 125 | 120 | 113 | 105 | 90 | 75 | 60 | 45 | 28 | 13 | 0 |
| 117 | 113 | 106 | 99 | 84 | 70 | 56 | 42 | 27 | 13 | 0 |
| 110 | 105 | 99 | 92 | 79 | 66 | 53 | 39 | 25 | 12 | 0 |
| 102 | 98 | 92 | 86 | 73 | 61 | 49 | 37 | 23 | 11 | 0 |
| 94 | 91 | 85 | 79 | 68 | 57 | 45 | 34 | 21 | 10 | 0 |
| 87 | 83 | 79 | 73 | 62 | 52 | 42 | 31 | 20 | 9 | 0 |
| 79 | 78 | 72 | 66 | 57 | 47 | 38 | 28 | 18 | 8 | 0 |
| 61 | 59 | 55 | 51 | 44 | 37 | 29 | 22 | 14 | 7 | 0 |
| 51 | 49 | 46 | 43 | 37 | 31 | 24 | 18 | 12 | 5 | 0 |
| 41 | 39 | 37 | 34 | 29 | 24 | 20 | 15 | 9 | 4 | 0 |
| 31 | 29 | 28 | 26 | 22 | 18 | 15 | 11 | 7 | 3 | 0 |
| 20 | 20 | 18 | 17 | 15 | 12 | 10 | 7 | 5 | 2 | 0 |
| 10 | 10 | 9 | 9 | 7 | 6 | 5 | 4 | 2 | 1 | 0 |
| 0 | 0 | 0 | 0 | 0 | 0 | 0 | 0 | 0 | 0 | 0 |

TABLE 30

Yellow Ink Composition (C1)

| 0 | 27 | 58 | 92 | 122 | 153 | 184 | 214 | 231 | 245 | 255 |
|---|---|---|---|---|---|---|---|---|---|---|
| 0 | 26 | 56 | 89 | 119 | 148 | 178 | 208 | 224 | 237 | 247 |
| 0 | 26 | 54 | 86 | 115 | 144 | 173 | 201 | 217 | 230 | 240 |
| 0 | 25 | 53 | 84 | 111 | 139 | 167 | 195 | 210 | 223 | 232 |
| 0 | 24 | 51 | 81 | 108 | 135 | 162 | 188 | 203 | 215 | 224 |
| 0 | 23 | 49 | 78 | 104 | 130 | 156 | 182 | 196 | 208 | 217 |
| 0 | 22 | 47 | 75 | 100 | 125 | 151 | 176 | 189 | 201 | 209 |
| 0 | 21 | 46 | 73 | 97 | 121 | 145 | 169 | 182 | 193 | 201 |
| 0 | 20 | 42 | 67 | 89 | 112 | 134 | 156 | 169 | 179 | 186 |
| 0 | 19 | 40 | 64 | 86 | 107 | 129 | 150 | 162 | 171 | 179 |
| 0 | 18 | 39 | 62 | 82 | 103 | 123 | 144 | 155 | 164 | 171 |
| 0 | 17 | 37 | 59 | 78 | 98 | 118 | 137 | 148 | 157 | 163 |
| 0 | 17 | 35 | 56 | 75 | 93 | 112 | 131 | 141 | 149 | 156 |
| 0 | 16 | 33 | 53 | 71 | 89 | 106 | 124 | 134 | 142 | 148 |
| 0 | 15 | 32 | 50 | 67 | 84 | 101 | 118 | 127 | 135 | 140 |
| 0 | 13 | 28 | 45 | 60 | 75 | 90 | 105 | 113 | 120 | 125 |
| 0 | 13 | 27 | 42 | 56 | 70 | 84 | 99 | 106 | 113 | 117 |
| 0 | 12 | 25 | 39 | 53 | 66 | 79 | 92 | 99 | 105 | 110 |
| 0 | 11 | 23 | 37 | 49 | 61 | 73 | 86 | 92 | 98 | 102 |
| 0 | 10 | 21 | 34 | 45 | 57 | 68 | 79 | 85 | 91 | 94 |
| 0 | 9 | 20 | 31 | 42 | 52 | 62 | 73 | 79 | 83 | 87 |
| 0 | 8 | 18 | 28 | 38 | 47 | 57 | 66 | 72 | 78 | 79 |
| 0 | 7 | 14 | 22 | 29 | 37 | 44 | 51 | 55 | 59 | 61 |
| 0 | 5 | 12 | 18 | 24 | 31 | 37 | 43 | 46 | 49 | 51 |
| 0 | 4 | 9 | 15 | 20 | 24 | 29 | 34 | 37 | 39 | 41 |
| 0 | 3 | 7 | 11 | 15 | 18 | 22 | 26 | 28 | 29 | 31 |
| 0 | 2 | 5 | 7 | 10 | 12 | 15 | 17 | 18 | 20 | 20 |
| 0 | 1 | 2 | 4 | 5 | 6 | 7 | 9 | 9 | 10 | 10 |
| 0 | 0 | 0 | 0 | 0 | 0 | 0 | 0 | 0 | 0 | 0 |

L* value, a* value, and b* value in accordance with the CIE standard were obtained from the measurement results thus obtained. C* was found from the following Formula 1 and h was found from the following Formula 2 by using those values. The found values were plotted on a graph.

$$C^* = (a^{*2} + b^{*2})^{1/2}. \quad \text{Formula 1}$$

$$h = \tan^{-1}(b^*/a^*). \quad \text{Formula 2}$$

The results are shown in FIGS. 9 to 12. In all the figures, the working examples and comparative examples produced almost identical hue. This result indicates that excellent color reproducibility was obtained even in a high-chroma and low-lightness region despite the fact that the concentration of the pigment in the magenta ink in the working examples was 4.0 wt. % and 2.0wt. %, that is substantially lower than in the comparative example (5.5 wt. %).

Evaluation of Luster

A device GP-200 manufactured by Murakami Shikizai Kenkyu K. K. was used to evaluate the luster of the printed matters obtained by the above-described method. The measurements were conducted at 12V50 W, an incident light flux diaphragm diameter of 1 mm, a reflected light diaphragm diameter of 1.5 mm, a ND10 filter, an incidence angle of 45 degrees, a fan angle of 0 degree and a standard mirror surface plate of 42.5 and the maximum value was measured. The results obtained for the ink sets 1 to 3 are shown in Tables 31 to 33.

TABLE 31

Ink set 1 (working example)

| | |
|---|---|
| Y | 13 |
| M | 23 |
| C | 23 |
| Y + M | 19 |
| Y + C | 17 |
| M + C | 24 |
| Average | 20 |

M = M1 (PV32: 4.0 wt. %);
Y = Y1;
C = C1

TABLE 32

Ink set 2 (working example)

| | |
|---|---|
| Y | 13 |
| M | 53 |
| C | 23 |
| Y + M | 25 |
| Y + C | 17 |
| M + C | 28 |
| Average | 26 |

M = M2 (PV32: 2.0 wt. %);
Y = Y1;
C = C1

TABLE 33

Ink set 3 (comparative example)

| | |
|---|---|
| Y | 13 |
| M | 7 |
| C | 23 |
| Y + M | 7 |
| Y + C | 17 |
| M + C | 9 |
| Average | 13 |

M = m1 (PR202: 5.5 wt. %);
Y = Y1;
C = C1

The results presented above confirmed that the ink sets 1 and 2 comprising the magenta ink comprising PV32 have a high average maximum luster of 20 or more, whereas the ink set 3 containing no PV32 has a low average maximum luster of 13.

Working Example D

Preparation of Ink Set

Magenta inks (M1), (m1), yellow ink (Y1), and cyan ink (C1) of the below-described compositions contained in each ink set of the working examples and comparative examples were prepared by the usual methods. Thus, the inks were prepared by dispersing the coloring agent component together with the dispersing agent component, then adding and mixing other components, and filtering out insolubles with a size above a fixed level. The inks obtained were combined to obtain ink sets of working examples and comparative examples.

The magenta ink (M1) comprised C. I. Pigment Violet 32 and C. I. Pigment Violet 19 as the coloring material, whereas (m1) contained no C. I. Pigment Violet 32 and comprised C. I. Pigment Red 202.

| Magenta Ink (M1) | |
|---|---|
| C.I. Pigment Violet 32 | 1.0 wt. % |
| C.I. Pigment Violet 19 | 1.0 wt. % |
| Dispersant (styrene-acrylic acid copolymer) | 2.0 wt. % |
| Glycerin | 20.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

| Magenta Ink (m1) | |
|---|---|
| C.I. Pigment Red 202 | 6.0 wt. % |
| Dispersant (styrene-acrylic acid copolymer) | 2.8 wt. % |
| Glycerin | 10.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

| Yellow Ink (Y1) | |
|---|---|
| C.I. Pigment Yellow 74 | 3.0 wt. % |
| Dispersant (styrene-acrylic acid copolymer) | 1.5 wt. % |
| Glycerin | 20.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

| Cyan Ink (C1) | |
|---|---|
| C.I. Pigment Blue 15:3 | 1.5 wt. % |
| Dispersant (styrene-acrylic acid copolymer) | 0.8 wt. % |
| Glycerin | 20.0 wt. % |
| 1,2-Hexanediol | 7.0 wt. % |
| Triethanolamine | 0.9 wt. % |
| BYK348 | 0.1 wt. % |
| Ultrapure water | Balance |
| Total | 100.0 wt. % |

The results obtained in measuring the reverse-flow viscosity are shown in Table 34.

TABLE 34

|  | M1 | m1 | Y1 | C1 |
|---|---|---|---|---|
| Reverse-flow viscosity | 3.6 | 3.6 | 3.6 | 3.6 |

The results obtained demonstrated that the magenta ink M1 with a glycerin concentration as high as 20.0 wt. % still had the same viscosity as m1 which comprised glycerin only at 10.0 wt. %. This is apparently because the pigment had a comparatively low concentration in M1.

As follows from Table 22 and Table 23, the magenta ink M1 satisfies the following conditions: when the a* value in accordance with the CIE standard that is calculated from a visible absorption spectrum is 80 in a diluted aqueous solution with a dilution ratio of 10,000 or less, the b* value is −38 or more to −29 or less, or the a* value in accordance with the CIE standard that is calculated from a visible absorption spectrum is 5 or more in a diluted aqueous solution with a pigment concentration of 2×10−3 g/L.

The above-described inks were combined as shown in Table 35 to obtain an ink set 1 as a working example and an ink set 2 as a comparative example.

TABLE 35

|  | Magenta ink | Yellow ink | Cyan ink |
|---|---|---|---|
| Ink set 1 (working example) | M1 | Y1 | C1 |
| Ink set 2 (comparative example) | m1 | Y1 | C1 |

Evaluation of Color

With respect to the ink sets 1 and 2, the ink-jet printer PX-G900 (manufactured by Seiko-Epson Co., Ltd.) produced an output on photographic paper "Luster" in a high-accuracy chroma mode for photographic paper "Luster", and color measurements of the printed product thus obtained were conducted in the same manner as in the above-described embodiment by using a Macbeth-Spectroscan manufactured by Gretag Co. The ejection patterns of each of M1, m1, Y1, and C1 inks were found.

L* value, a* value, and b* value in accordance with the CIE standard were obtained from the measurement results thus obtained (not displayed). C* was found from the following formula by using those values and was plotted on a graph where C* is on the abscissa and L* is on the ordinate.

$$C^* = (a^{*2} + b^{*2})^{1/2}$$

Figure 13:
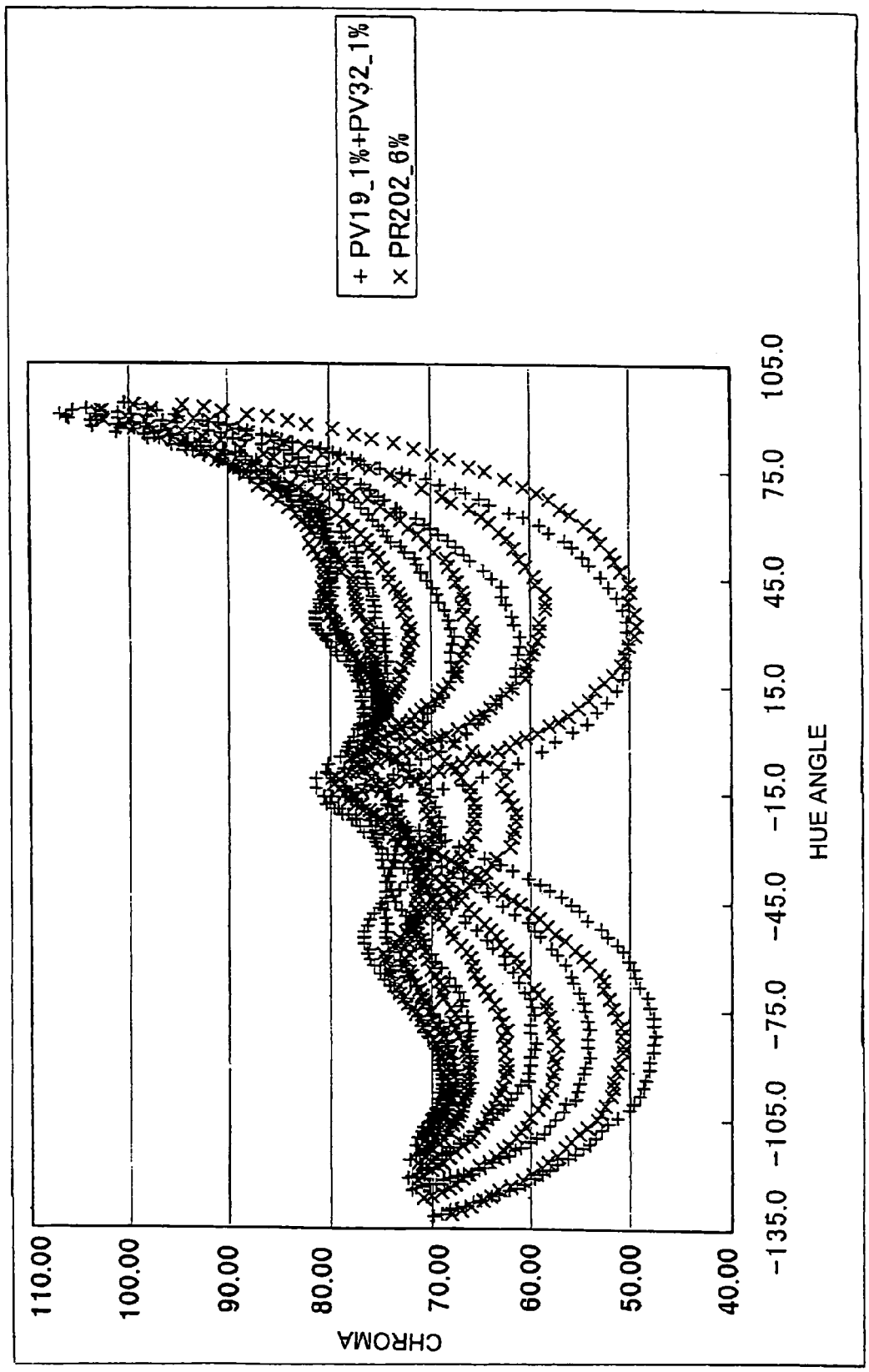
FIG. 13 is a graph illustrating the relationship between hue angle and chroma of magenta inks used in working examples and comparative examples.
Figure 14:
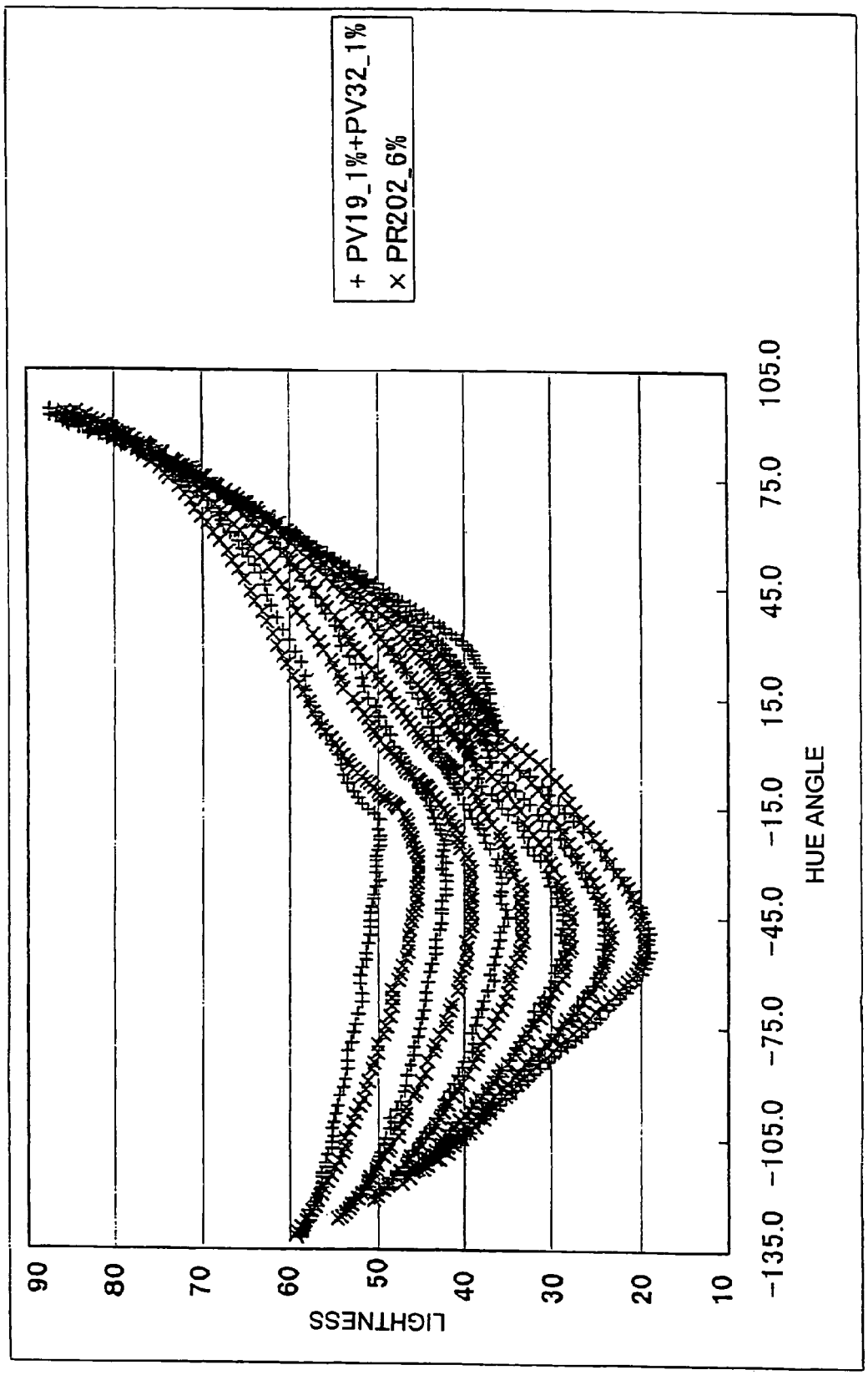
FIG. 14 is a graph illustrating the relationship between hue angle and lightness of magenta inks used in working examples and comparative examples.

The results are shown in FIGS. 13 to 14. In all the figures, the working examples and comparative examples produced almost identical hue. This result indicates that excellent color reproducibility was obtained even in a high-chroma and low-lightness region despite the fact that the concentration of the pigment in the magenta ink in the working example was 2.0 wt. %, that is substantially lower than in the comparative example (6.0 wt. %).

Evaluation of Luster

A device GP-200 manufactured by Murakami Shikizai Kenkyu K. K. was used to evaluate the luster of the printed matters obtained by the above-described method. The measurements were conducted at 12V 50 W, an incident light flux diaphragm diameter of 1 mm, a reflected light diaphragm diameter of 1.5 mm, a ND10 filter, an incidence angle of 45 degrees, a fan angle of 0 degree, and a standard mirror surface plate of 42.5, and the maximum value was measured. The results obtained for the ink sets 1 and 2 are shown in Tables 36 to 37.

TABLE 36

| Ink set 1 (working example) | |
| --- | --- |
| Y | 35 |
| M | 42 |
| C | 43 |
| Y + M | 35 |
| Y + C | 30 |
| M + C | 31 |
| Average | 36 |

TABLE 37

| Ink set 2 (comparative example) | |
| --- | --- |
| Y | 35 |
| M | 6 |
| C | 43 |
| Y + M | 8 |
| Y + C | 30 |
| M + C | 7 |
| Average | 21 |

The results presented above confirmed that the ink set 1 comprising the magenta ink comprising PV32 and PV19 have a high average maximum luster of 35 or more, whereas the ink set 2 containing no PV32 (contained PR202) has a low average maximum luster of 21.

The invention demonstrates industrial-applicability by providing a magenta ink that excels in color reproducibility in a high-chroma and low-lightness region, suppresses clogging of ink-jet recording heads, and has increased luster, an ink set for ink-jet recording comprising the magenta ink that excels in color reproducibility in a high-chroma and low-lightness region, suppresses clogging of ink-jet recording-heads, and has increased luster, and also a magenta ink that excels in color reproducibility in a high-chroma and low-lightness region and also granularity, suppresses clogging of ink-jet recording heads, and has increased luster, an ink set for ink-jet recording comprising the magenta ink that excels in color reproducibility in a high-chroma and low-lightness region and also granularity, suppresses clogging of ink-jet recording heads, and has increased luster, as well as an ink cartridge, a recording method, a recording system, and recorded matter using such magenta inks and ink sets.

What is claimed is:

1. A magenta ink composition comprising at least C.I. Pigment Violet 32 and C.I. Pigment Violet 19 as pigments, wherein when the a* value of the composition in accordance with the CIE standard that is calculated from a visible absorption spectrum is 80 in a diluted aqueous solution with a dilution ratio of 10,000 or less, the b* value is −38 or more to −29 or less and the L* value in accordance with the CIE standard is 60 or less, and wherein the mixing ratio of the C.I. Pigment Violet 32 and the C.I. Pigment Violet 19 is 1:2 to 2:1.

2. The magenta ink composition according to claim 1, wherein the a* value in accordance with the CIE standard that is calculated from a visible absorption spectrum is 5 or more in a diluted aqueous solution with a pigment concentration of $2 \times 10^{-3}$ g/L.

3. The magenta ink composition according to claim 1, wherein the sum concentration of the C.I. Pigment Violet 32 and the C.I. Pigment Violet 19 is 4 wt. % or less.

4. The magenta ink composition according to claim 1, comprising a 14-30 wt. % organic solvent with a high boiling point.

5. The magenta ink composition according to claim 4, wherein the organic solvent with a high boiling point includes glycerin.

6. The magenta ink composition according to claim 1, comprising a a dispersant for dispersing the pigment at 10-140 wt. % based on the pigments.

7. The magenta ink composition according to claim 1, comprising a 1-20 wt. % permeation enhancer.

8. The magenta ink composition according to claim 1, comprising 0.01-5 wt. % of at least one of acetylene glycol-type compound and silicone-type compound.

9. An ink cartridge comprising the magenta ink composition according to claim 1.

10. A recording method comprising providing the magenta ink composition according to claim 1, and forming an image with the magenta ink composition on a recording medium.

11. A recorded matter comprising an image is formed with the magenta ink composition according to claim 1.

12. An ink set comprising a plurality of inks including the magenta ink composition according to claim 1.

13. The ink set according to claim 12, further comprising a yellow ink and a cyan ink.

14. The ink set according to claim 13, wherein the pigment concentration of the yellow ink is 5.5% or less and the pigment concentration of the cyan ink is 4% or less.

15. The ink set according to claim 13, wherein the yellow ink includes C.I. Pigment Yellow 74 and the cyan ink includes C.I. Pigment Blue 15:3 as pigments, respectively.

16. The ink set according to claim 12, further comprising a black ink.

17. The ink set according to claim 12, wherein each ink includes a pigment as a coloring material and also includes a dispersant for dispersing the pigment at 10-140 wt. % based on the pigment, respectively.

18. The ink set according to claim 12, wherein each ink includes a 0.1-30 wt. % organic solvent with a high boiling point.

19. The ink set according to claim 12, wherein each ink includes a 1-20 wt. % permeation enhancer.

20. The ink set according to claim 12, wherein each ink includes 0.01-5 wt. % of at least one of acetylene glycol-type compound and silicone-type compound.

21. An ink cartridge comprising the ink set according to claim 12.

22. A recording method for forming an image comprising depositing each of the plurality of inks of the ink set according to claim 12 on a recording medium.

23. A recording method for forming an image comprising depositing each of the plurality of inks of the ink set according to claim 13 on a recording medium.

24. A recorded matter comprising an image formed with the plurality of inks of the ink set according to claim 12.

* * * * *